United States Patent
Lee et al.

(10) Patent No.: US 12,493,577 B2
(45) Date of Patent: Dec. 9, 2025

(54) DIGITAL SIGNAL PROCESSOR (DSP) AND ELECTRONIC DEVICE USING THE SAME

(71) Applicant: SAMSUNG ELECTRONICS CO., LTD., Suwon-si (KR)

(72) Inventors: Hyungwoo Lee, Suwon-si (KR); Soon-Wan Kwon, Suwon-si (KR); Seok Ju Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 18/512,788

(22) Filed: Nov. 17, 2023

(65) Prior Publication Data

US 2024/0419628 A1  Dec. 19, 2024

(30) Foreign Application Priority Data

Jun. 14, 2023 (KR) .................. 10-2023-0076305

(51) Int. Cl.
  *G06F 15/80* (2006.01)
  *G06F 9/38* (2018.01)

(52) U.S. Cl.
  CPC ........ *G06F 15/8061* (2013.01); *G06F 9/3802* (2013.01)

(58) Field of Classification Search
  None
  See application file for complete search history.

(56) References Cited

U.S. PATENT DOCUMENTS

| | | | |
|---|---|---|---|
| 10,282,206 B1 * | 5/2019 | Sun | G06F 9/30141 |
| 10,979,065 B1 | 4/2021 | Chang et al. | |
| 11,175,915 B2 * | 11/2021 | Finkbeiner | G06F 9/3012 |
| 11,355,170 B1 * | 6/2022 | Yudanov | G11C 8/06 |
| 2017/0083434 A1 * | 3/2017 | Potash | G06F 9/3824 |
| 2019/0065111 A1 * | 2/2019 | Lea | G06F 15/7821 |
| 2020/0026498 A1 | 1/2020 | Sumbul et al. | |
| 2021/0150328 A1 | 5/2021 | Dasalukunte et al. | |
| 2021/0247978 A1 * | 8/2021 | Malladi | G06F 7/5318 |
| 2022/0113974 A1 | 4/2022 | Omer et al. | |
| 2022/0414443 A1 | 12/2022 | Li | |
| 2023/0025068 A1 * | 1/2023 | Badaroglu | G06F 15/80 |
| 2023/0205693 A1 * | 6/2023 | Kotra | G06F 12/0811 |
| | | | 711/122 |

(Continued)

FOREIGN PATENT DOCUMENTS

| | | | |
|---|---|---|---|
| KR | 10-2022-0145143 A | 10/2022 | |
| KR | 10-2024-0044918 A | 4/2024 | |
| WO | WO-2022046570 A1 * | 3/2022 | G06F 30/347 |

OTHER PUBLICATIONS

Seshan, Nat. "High velociti processing [texas instruments vliw dsp architecture]." *IEEE Signal Processing Magazine* 15.2 (Mar. 1998): pp. 86-101.

(Continued)

*Primary Examiner* — Eric Coleman
(74) *Attorney, Agent, or Firm* — NSIP Law

(57) ABSTRACT

Provided are a digital signal processor (DSP) and an electronic device using the same. The DSP includes: a first function unit (FU) having a non-IMC (in-memory computing) operation architecture using an operation unit; a second FU having an IMC architecture using a memory cell array; and a register file used by the first FU and the second FU.

20 Claims, 20 Drawing Sheets

(56) References Cited

U.S. PATENT DOCUMENTS

2023/0223065 A1\* 7/2023 Kang ............... G06F 13/1631
  365/145

OTHER PUBLICATIONS

Qualcomm Hexagon V67 Programmer's Reference Manual. *Aualcomm Technologies, Inc.* (Feb. 25, 2020).
Subcommittee, Memory. "Session 11 Overview: Compute-in-Memory and SRAM." *TSMC 5nm SRAM IMC Architecture* (2022).
Chollet, François. "Xception: Deep learning with depthwise separable convolutions." *Proceedings of the IEEE conference on computer vision and pattern recognition.* 2017.

\* cited by examiner

DIGITAL SIGNAL PROCESSOR (DSP) AND ELECTRONIC DEVICE USING THE SAME

CROSS-REFERENCE TO RELATED APPLICATIONS

This application claims the benefit under 35 USC § 119(a) of Korean Patent Application No. 10-2023-0076305, filed on Jun. 14, 2023, in the Korean Intellectual Property Office, the entire disclosure of which is incorporated herein by reference for all purposes.

BACKGROUND

1. Field

The following description relates to a digital signal processor (DSP) and an electronic device using the same.

2. Description of Related Art

A vector matrix multiplication operation, often implemented as a multiply-accumulate (MAC) hardware operation, bears on the performance of applications in various fields. For example, the MAC operation may be performed for machine learning and authentication of neural networks that may include many layers. An input signal may be considered to form an input vector, and the data thereof may be data of images, byte streams, or other data sets. An input signal may be multiplied by a weight of a neural network, and an output vector may be obtained based on a result of MAC operations. The output vector may be provided as an input vector for a subsequent layer of the neural network. Since the MAC operation as above is repeated for multiple layers of the neural network, the neural network processing performance is mainly determined by the performance of the MAC operation. The MAC operation may be implemented through in-memory computing, which is a type of memory in which MAC operations can be performed on data in the memory without having to move the data in and out of the memory (i.e., on data that is stored in the memory before, during, and after a MAC operation).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor includes: a first function unit (FU) having a non-IMC (in-memory computing) operation architecture using an operation unit; a second FU having an IMC architecture using a memory cell array; and a register file used by the first FU and the second FU.

The first FU may be configured to perform non-IMC operation using a logic gate of the operation unit, and the second FU may be configured to perform an IMC operation using a bit cell in the memory cell array.

The processor may be a digital signal processor (DPS) and wherein the first FU includes a scalar FU configured to perform a scalar operation or a vector FU configured to perform a vector operation.

The first FU and the second FU may belong to different lanes of a set of lanes that are configured to process instructions independently of each other.

The processor may further include a very long instruction word (VLIW) packetizer configured to generate a VLIW packet by packetizing independent instructions into the VLIW packet, wherein the first FU is configured to process a first instruction of the VLIW packet, and the second FU is configured to process a second instruction of the VLIW packet.

The processor may further include a buffer block disposed between the second FU and the register file and configured to perform data transmission between the second FU and the register file.

The buffer block may include: an input first-in-first-out (FIFO) buffer configured to transmit input data stored in the register file to the memory cell array of the second FU; and an output FIFO buffer configured to transmit, to the register file, output data generated through the memory cell array of the second FU.

The register file may include: a first register file used by the first FU; and a second register file used by the second FU, wherein when input data is loaded into the second register file, the input data is stored into the second FU via the buffer block.

The first FU may be configured to load input data into the register file according to a load instruction, when the input data is loaded into the register file, the input data may be transmitted to the buffer block, and the second FU may be configured to store the input data stored in the buffer block into the memory cell array according to a pop instruction.

The first FU may be configured to load input data into the register file according to a load instruction, when the input data is loaded into the register file, the input data may be transmitted to the buffer block, and the second FU is configured to, in a buffer mode, store the input data stored in the buffer block into the memory cell array without an explicit instruction.

The second FU may be configured to, when neural network input data is input into the memory cell array of the second FU in a state in which neural network weight data is stored in the memory cell array of the second FU, generate neural network output data by performing a multiply-accumulate (MAC) operation between the neural network weight data and the neural network input data.

The second FU may be configured to store the network output data stored in the memory cell array into the register file through the buffer block according to a push instruction.

One of the first FU and the second FU may configured to perform a first operation and store a first operation result into the register file, and the other one of the first FU and the second FU may be configured to perform a second operation based on the first operation result.

In another general aspect, a digital signal processor (DSP) includes: a very long instruction word (VLIW) packetizer configured to generate a VLIW packet by packetizing a plurality of independent instructions; and a first lane configured to process a first instruction of the VLIW packet based on a non-IMC architecture using an operation unit; and a second lane configured to process a second instruction of the VLIW packet based on an IMC operation architecture using a memory cell array.

A first function unit (FU) of the first lane may be configured to perform a non-IMC operation using a logic gate of the operation unit, and a second FU of the second lane may be configured to perform an IMC operation using a bit cell in the memory cell array.

The first lane may include a first FU having the non-IMC operation architecture and a first register file used by the first FU, the second lane may include a second FU having the memory cell array and a second register file used by the second FU, wherein the DSP may further include a buffer block disposed between the second FU and the second register file and configured to perform data transmission between the second FU and the second register file.

One of the first FU and the second FU may be configured to perform a first operation to process the first instruction and store a corresponding first operation result in one of the first register file and the second register file, and the other one of the first FU and the second FU may be configured to perform a second operation to process the second instruction based on the first operation result.

In another general aspect, a method includes: fetching, by a processor, an instruction including a bundle of instructions including a first instruction, a second instruction, and a third instruction; executing the fetched first instruction by a first non-IMC FU of a first lane of the processor; executing the fetched second instruction by a second non-IMC FU of a second lane of the processor; and executing the fetched third instruction by an IMC FU of a first lane of the processor.

The processor may include a single chip, the first non-IMC FU may include a vector FU, the second non-IMC FU may include a scalar FU, and the IMC FU may be configured to perform a multiply-and-accumulate on data retained in memory of the IMC FU.

The method may further include placing the processor in a buffer mode and based thereon configuring the processor to cause the IMC FU to function as a buffer for the first non-IMC FU and the second non-IMC FU.

Other features and aspects will be apparent from the following detailed description, the drawings, and the claims.

Figure 1:
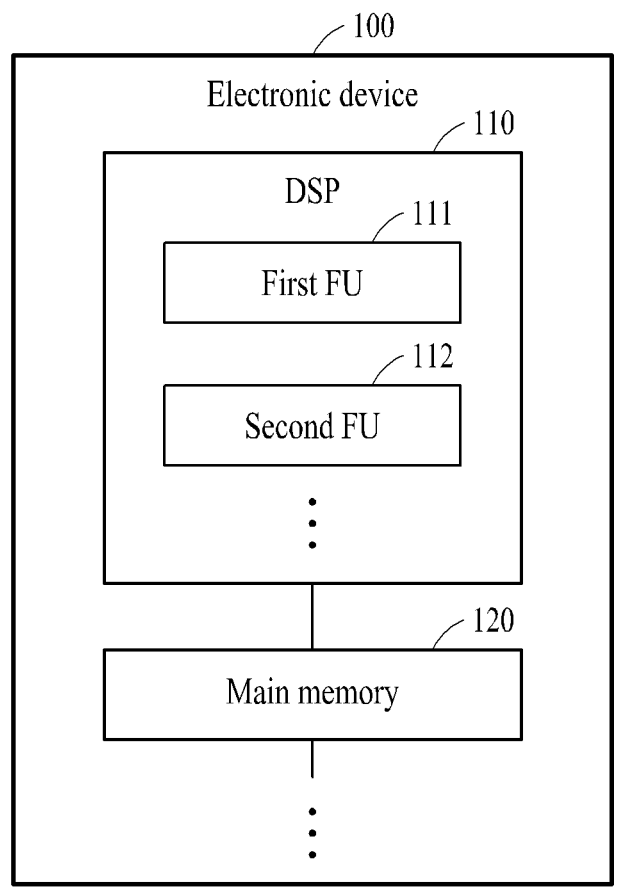
FIG. 1 illustrates an example of a partial configuration of an electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of a partial configuration of an electronic device, according to one or more embodiments. Referring to FIG. 1, an electronic device 100 may include a main memory 120 to store data and a digital signal processor (DSP) 110 to process the data stored in the main memory 120. The DSP 110 may include a first function unit (FU) having a legacy operation architecture using an operation unit and a second FU 112 having an in-memory operation architecture using a memory cell array.

The second FU 112 may include the memory cell array. The memory cell array may function as a memory device by storing data. The memory cell array may also function as an operation device and may derive an operation result by performing an operation on the data stored in the memory device (the data is an operand of the operation and is stored in the memory device before, during, and after the operation). The operation of the memory cell may be a multiply-accumulate (MAC) operation, which is performed through in-memory computing (IMC) technology. IMC technology is for deriving operation results between data stored in a memory element and an input (e.g., a control signal) for the memory element, and the operation results are derived using the structural characteristics of the memory element. Such structural characteristics of an IMC device may include, for example, crossbar arrays of memory cells, input lines to provide inputs to the IMC device, operation units (e.g., bitwise multipliers) that operate on the inputs and the memory cells, adder trees to add results of those operations, and accumulators to accumulate the multiplication results of successive inputs.

In contract with IMC processing, von Neumann architecture processing has performance and power limitations due to frequent movements of data between an operation device and a memory device. The operation device may be a processor and the memory device may be a mass storage device such as a disk storage device (e.g., a hard disk drive (HDD)), a flash memory, a dynamic random-access memory (DRAM), or the like. IMC is a computer architecture for directly performing operations in the memory storing data, such that data movements between an operation device and a memory device may be reduced, and power efficiency may increase. In the case of a neural network having weights, an operation between a feature map (for example) and the neural network may be performed by an IMC device either (i) storing the weights in a memory cell array of the IMC device and receiving the feature map as an input, or (ii) storing the feature map in the memory cell array and receiving the weights as an input.

The second FU 112 may perform a MAC operation using IMC. As noted above, MAC operations may be a significant portion of operations for implementing an artificial intelligence (AI) algorithm. For example, the majority of processing layers of a neural network model may be performed through a MAC operation. Such layer processing may include a MAC operation of summing results obtained by multiplying each of input values of input nodes by a weight. The MAC operation may be expressed, for example, as in Equation 1 below.

$$O_0 = \sum_{m=0}^{M-1} I_m W_{0,m}, O_1 = \sum_{m=0}^{M-1} I_m W_{1,m}, \ldots, O_{T-1} = \sum_{m=0}^{M-1} I_m W_{T-1,m} \quad \text{Equation 1}$$

In Equation 1, $O_t$ denotes an output to a t-th node, $I_m$ denotes an m-th input, and $W_{t,m}$ denotes a weight applied to the m-th input inputted to the t-th node. $O_t$ may be an output of a node or a node value and may be calculated as a weighted sum of the input $I_m$ and the weight $W_{t,m}$. Here, m ranges from 0 to M−1 and t ranges from 0 to T−1. M is the number of nodes of a previous layer connected to one node of the current layer being operated upon, and T is the number of nodes of the current layer.

IMC may be divided into analog IMC and digital IMC devices. Analog IMC devices perform MAC operations in an analog domain including a current, electric charge, or time domain. Digital IMC devices perform MAC operations using a logic circuit. Digital IMC may be readily implemented in an advanced process and generally exhibits excellent performance. The second FU 112 may be a digital IMC device. For example, the second FU 112 may have a static random-access memory (SRAM) including transistors (e.g., 6 transistors). An SRAM including 6 transistors may also be referred to as a 6T SRAM. Since the SRAM stores data as logical values of 0 and 1, analog to digital conversion is not required.

The in-memory operation architecture of the second FU 112 may have such IMC architecture. The legacy operation architecture of the first FU 111 may be an architecture other than an IMC architecture. For example, the legacy operation architecture may correspond to an architecture using a traditional logic gate-based operation unit such as an arithmetic logical unit (ALU) and a MAC operator that operates on inputted operands (e.g., in registers) rather than on an operand stored in memory as with an IMC FU. The term legacy in the legacy operation architecture refers to the architecture being an architecture other than the IMC operation architecture. That is, the term "legacy operation architecture" collectively refers to operation architectures that do not use the IMC operation architecture. The first FU 111 may include a scalar FU that performs a scalar operation and/or a vector FU that performs a vector operation. An operation using the legacy operation architecture will sometimes be referred to as a legacy operation, and an operation using the in-memory operation architecture will sometimes be referred to as an in-memory operation. However, where the term "legacy operation" is used, the term "non-IMC" operation is also applicable (i.e., an operation performed by an FU other than an IMC-based FU).

Although not shown in FIG. 1, the DSP 110 may further include an additional component such as a register file. The register file may be used for operations of the first FU 111 and the second FU 112. The register file may be an array of general purpose registers.

The main memory 120 may store data provided to an operation of the DSP 110, operation results of the DSP 110, code of an application program or task, and the like. The main memory 120 may be positioned closest (in terms of latency) to the DSP 110 among memories outside of the DSP 110. For example, the main memory 120 may be a DRAM.

Figure 2:
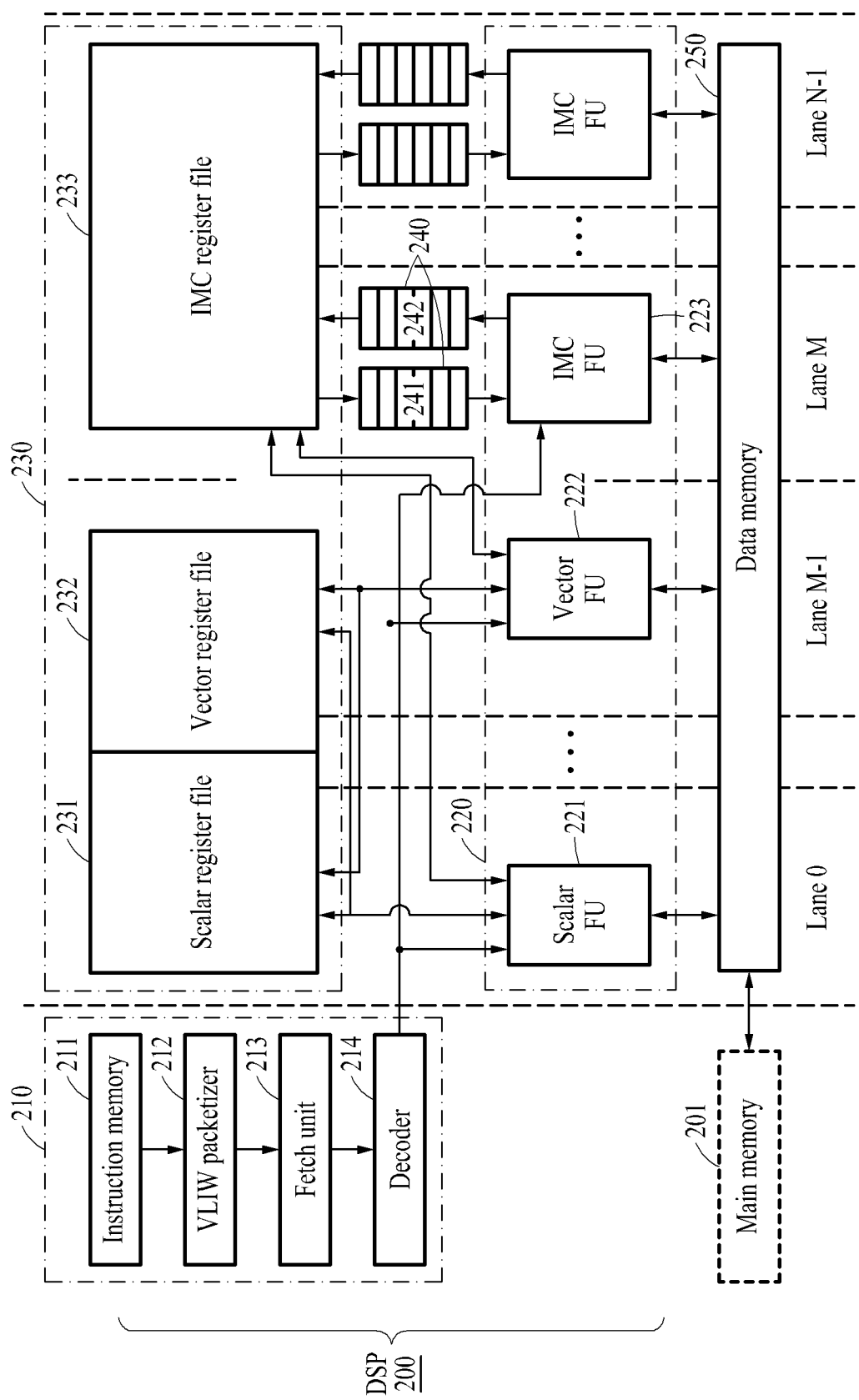
FIG. 2 illustrates an example of a structure of a digital signal processor (DSP), according to one or more embodiments.

FIG. 2 illustrates an example of a structure of a DSP, according to one or more embodiments. Referring to FIG. 2, a DSP 200 may include an instruction providing block 210, an FU block 220, a register file block 230, a buffer block 240, and a data memory 250.

The instruction providing block 210 may include an instruction memory 211, a very long instruction word (VLIW) packetizer 212, a fetch unit 213, and a decoder 214.

The instruction memory 211 may store processor instructions. The processor instructions may be derived from code of an application program or task. That is, the instruction memory 211 may store application/task instructions.

The VLIW packetizer 212 may convert the processor instructions in the instruction memory 211 into a VLIW packet. VLIW is a technology that converts a group of individual instructions into a very long instruction word bundle. For example, if the instructions in the instruction memory 211 are 32 bits each, a 256 bit VLIW may contain a bundle of 8 instructions. A VLIW processor (e.g., a VLIW DSP) generally has an architecture for processing instructions in parallel using VLIW features. The VLIW packet may contain an instruction bundle. The fetch unit 213 may fetch VLIW instructions (which may be instruction bundles), and the decoder 214 may decode each fetched instruction. The FU block 220 may process each instruction as signaled by the corresponding decoding result.

A device with a VLIW architecture may include a processing unit capable of issuing (executing) an instruction bundle. The instruction bundle may be fetched at one time (as a VLIW packet) through the processing unit. The instruction bundle includes independent instructions for executing respective independent operations. A register required for each instruction/operation may be operated independently, and each operation may be executed independently on an individual lane. Each operation may have a predictable number of execution cycles. A compiler may generate the instruction bundle based on the number of execution cycles for each operation.

The VLIW architecture may have simpler hardware as compared to non-VLIW (e.g., RISC) architecture. Software (e.g., a compiler) checks the independency between a set of instructions in advance and then processes the set of instructions by grouping instructions whose independency has been verified by the compiler, and thus, the hardware may be simplified to a structure of simultaneously fetching the instructions input in the form of a bundle and performing operations for the instruction that are input into each lane.

Recent compiler developments have made it possible to improve the utilization of devices with the VLIW architecture. Predetermined types of processing (e.g., image processing, and artificial intelligence (AI)) having conditions (e.g., clear necessary cycles, clear start and end of operations, and simple data access patterns) suitable for a compiler to determine the independency of instructions being compiled may be ideal for the VLIW architecture.

The DSP 200 may include lanes for processing a VLIW packet. According to an example, the DSP 200 may include M+N lanes; M legacy operation lanes and N IMC operation lanes. Each lane may process instructions independently of each other. For example, one lane (e.g., an m-th lane of a first FU) may process a portion (instruction) of a VLIW packet based on the legacy operation architecture using an operation unit, and another lane (e.g., an n-th lane of a second FU) may process another portion (instruction) of the same VLIW packet based on the in-memory operation architecture using a memory cell array. Processing by the one lane and the other lane may be independent of each other.

One legacy operation lane (e.g., Lane 0) may include a scalar FU 221 and a scalar register file 231. Another legacy operation lane (e.g., Lane M−1) may include a vector FU 222 and a vector register file 232. The scalar FU 221 and the vector FU 222 may have a legacy operation architecture, and may be referred to as legacy FUs or first FUs. The first FUs may each perform a legacy operation using logic gates of an operation unit. The scalar register file 231 and the vector register file 232 may be used by the first FUs, and may be referred to as legacy register files or first register files. The scalar FU 221 and the vector register file 232 may each access both the scalar register file 231 and the vector register file 232.

An IMC FU 223 may have the in-memory operation architecture and may be referred to as a second FU. The IMC register file 233 may be used by the IMC FU 223, and may be referred to as a second register file. The second FU may perform an in-memory operation using a bit cell in the memory cell array. The first FUs and the second FU may belong to different lanes among the lanes of the DSP 200. There may be more than one IMC FU 223.

The buffer block 240 may be disposed between the IMC FU 223 and the register file (e.g., the IMC register file 233). The buffer block 240 may buffer data transmission between the IMC FU 223 and the IMC register file 233. The buffer block 240 may include (i) an input buffer 241 that transmits memory input data stored in the register file (e.g., the IMC register file 233) to the memory cell array of the second FU (e.g., the IMC FU 223) and (ii) an output buffer 242 that transmits memory output data generated through the memory cell array of the second FU to the IMC register file 233. The input buffer 241 and the output buffer 242 may be implemented as first-in-first-out (FIFO) buffers. The IMC register file 233 has a limited number of registers. The buffer block 240 may increase the efficiency (utilization) of the limited number of registers. In addition, the buffer block 240 may reduce a delay that may occur due to a memory operation (e.g., a write operation) of the IMC FU 223 and increase the operational efficiency of the DSP 200 and the IMC register file 233.

Data used for operations of the FU block 220 and operation results of the FU block 220 may be temporarily stored in the data memory 250. The main memory 201 may provide the data used for operations of the FU block 220 to the data memory 250 and may receive the operation results of the FU block 220 from the data memory 250.

The DSP 200 may provide an additional path through which a legacy FU, such as the scalar FU 221 or the vector FU 222, may directly access the IMC register file 233. The legacy FU may (i) transmit data to the IMC register file 233 through the additional path and (ii) fetch data from the IMC register file 233.

Figure 3:
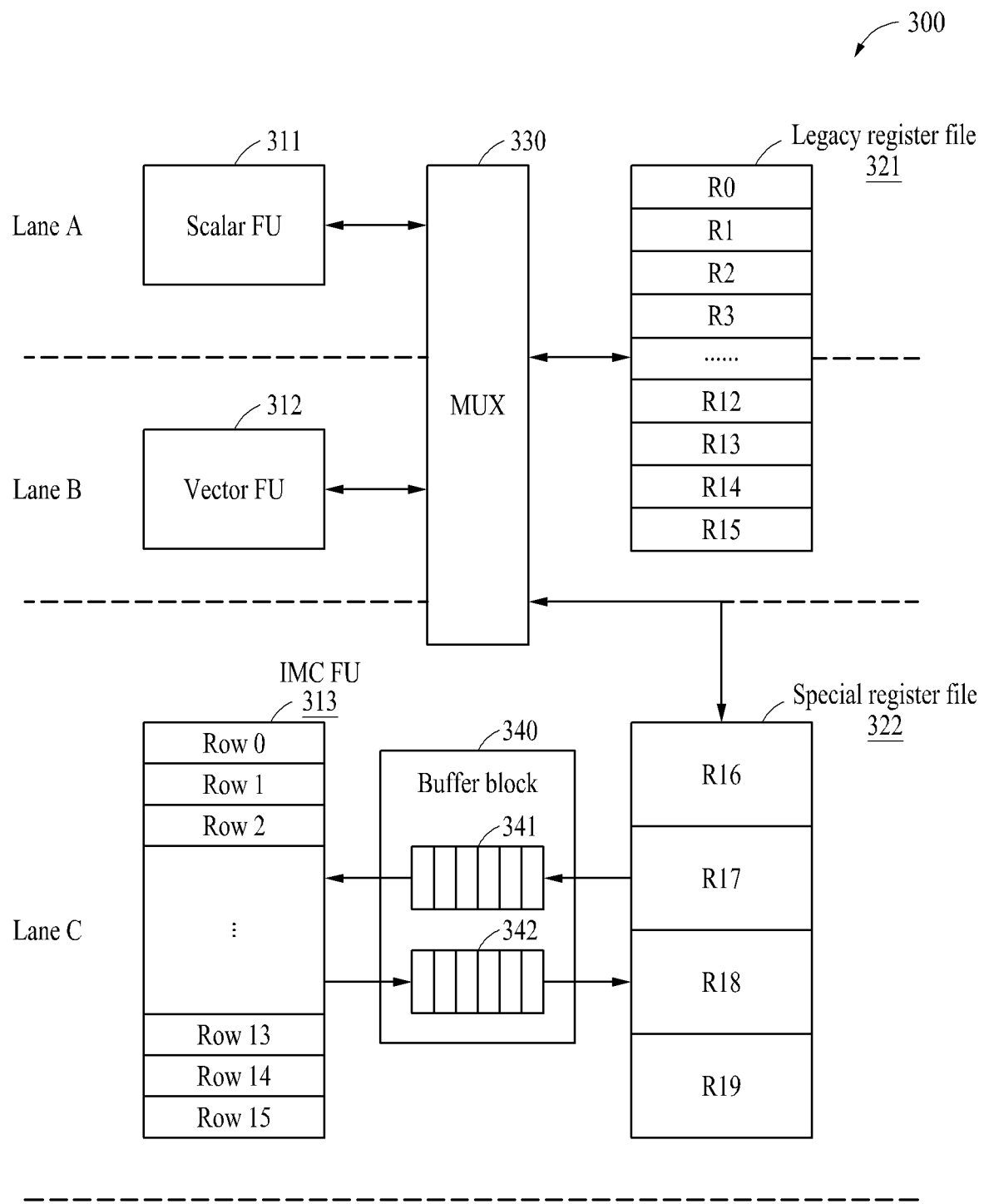
FIG. 3 illustrates an example of a detailed structure of lanes of a DSP, according to one or more embodiments.

FIG. 3 illustrates an example of a detailed structure of lanes of a DSP, according to one or more embodiments. Referring to FIG. 3, a DSP 300 may include a scalar FU 311, a vector FU 312, an IMC FU 313, a legacy register file 321, a special register file 322, a multiplexer (MUX) 330, and a buffer block 340.

The scalar FU 311 and the vector FU 312 may be legacy FUs and may perform operations according to input instructions. The scalar FU 311 may perform a scalar operation, and the vector FU 312 may perform a vector operation. The scalar operation and the vector operation may be performed using a legacy operation architecture. The IMC FU 313 may perform a MAC operation. The MAC operation may be performed using an in-memory operation architecture.

The legacy register file 321 may include a scalar register file for a scalar operation of the scalar FU 311 and a vector register file for a vector operation of the vector FU 312. The scalar register file and the vector register file may be distinguished from each other. For example, the scalar register file may have a property (e.g., a capacity) suitable for a scalar operation, and the vector register file may have a property suitable for a vector operation. FIG. 3 shows an example in which the legacy register file 321 includes 16 registers R0 to R15. The special register file 322 may be an IMC register file. The special register file 322 may have a property suitable for a MAC operation. FIG. 3 shows an example in which the special register file 322 includes 4 registers R16 to R19. The number of registers of the legacy register file 321 and the special register file 322 is not limited to the example of FIG. 3.

The scalar FU 311 and the vector FU 312 may perform operations using the legacy register file 321 and the special register file 322. For example, the scalar FU 311 and the vector FU 312 may perform an operation of loading data values from a memory into the legacy register file 321 and/or the special register file 322, an operation of performing an operation using the data values in the legacy register file 321 and/or the special register file 322, and an operation of storing operation results in the legacy register file 321 and/or the special register file 322. The MUX 330 may be a register MUX. The MUX 330 may form access paths to the legacy register file 321 and the special register file 322 for the scalar FU 311 and the vector FU 312.

The buffer block 340 may be disposed between the IMC FU 313 and the special register file 322. The buffer block 340 may perform data transmission between the IMC FU 313 and the special register file 322. The buffer block 340 may include an input buffer 341 configured to transmit memory input data stored in the special register file 322 to a memory cell array of the IMC FU 313 and an output buffer 342 configured to transmit memory output data generated through the memory cell array of the IMC FU 313 to the special register file 322. The memory output data may be a result of an in-memory operation based on the memory input data. The input buffer 341 and the output buffer 342 may be FIFO buffers.

According to FIG. 3, the IMC FU 313 may include rows, and the input buffer 341 and the output buffer 342 may each include columns. FIG. 3 illustrates the IMC FU 313 including 16 rows, but examples are not limited thereto. Each row of the IMC FU 313, each column of the input buffer 341, each column of the output buffer 342, and each register of the special register file 322 may have the same capacity (width). Memory input data in a first register (e.g., the register R16) of the special register file 322 may be transmitted through the columns of the input buffer 341 according (on a FIFO basis) and stored in a row (e.g., Row 0) of the IMC FU 313. When memory output data is generated as a result of an in-memory operation based on the memory input data, the memory output data may be transmitted through the columns of the output buffer 342 (on a FIFO basis) and stored in the first register or another register (e.g., the register R17) of the special register file 322. Although FIG. 3 shows an example of managing the IMC FU 313 in rows, the IMC FU 313 may be managed in columns.

The scalar FU 311, the vector FU 312, and the IMC FU 313 may belong to different respective lanes among lanes in the DSP 300 that are configured to process instructions independently of each other. FIG. 3 shows an example in which the scalar FU 311 belongs to lane A, the vector FU 312 belongs to lane B, and the IMC FU 313 belongs to lane C. The legacy register file 321 and the special register file 322 may be managed to ensure independent operation processing of the scalar FU 311, the vector FU 312, and the IMC FU 313.

Figure 4A:
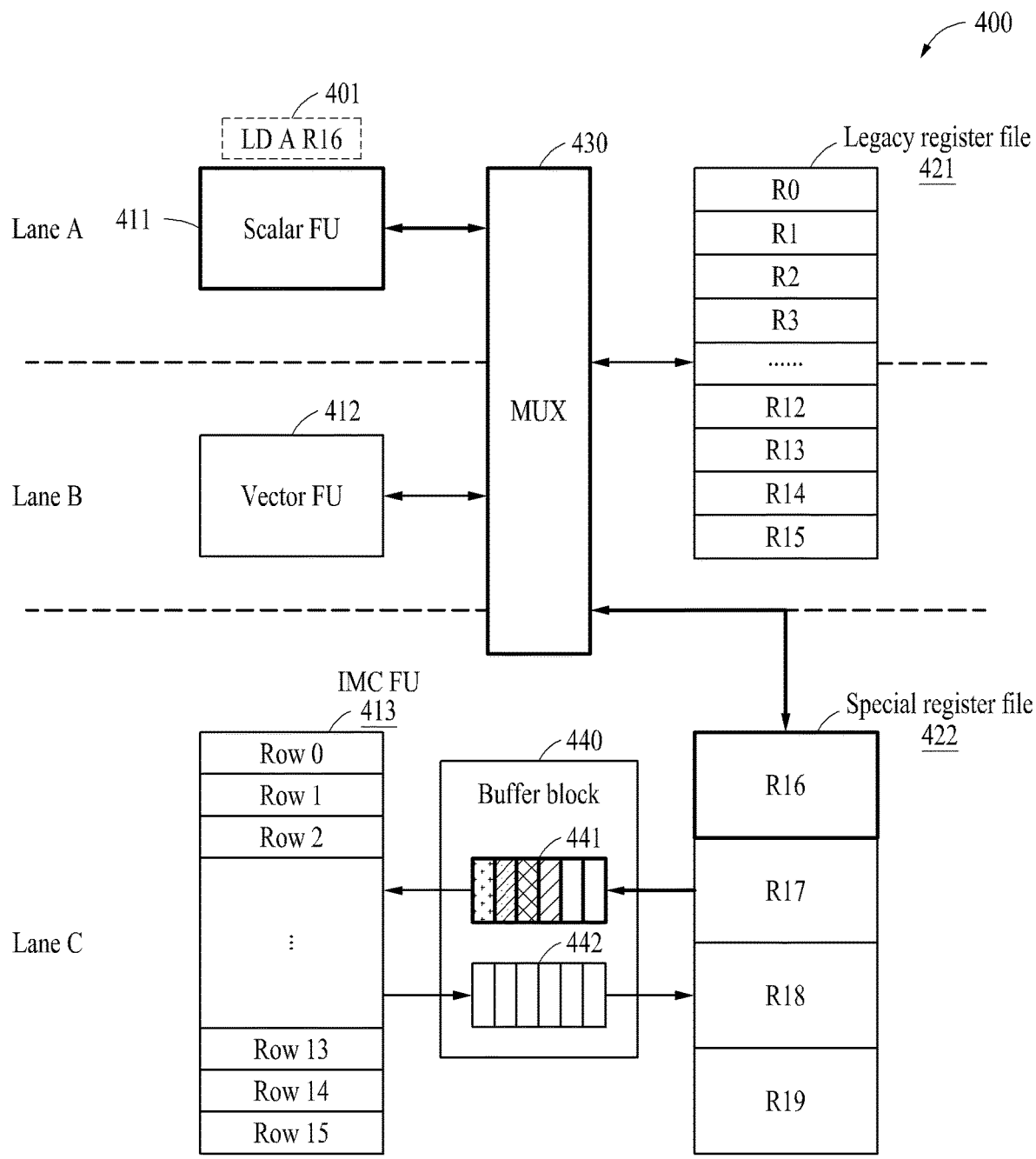
FIGS. 4A and 4B illustrate examples of storing memory input data in an in-memory computing (IMC) function unit (FU) using a legacy FU, according to one or more embodiments.
Figure 4B:
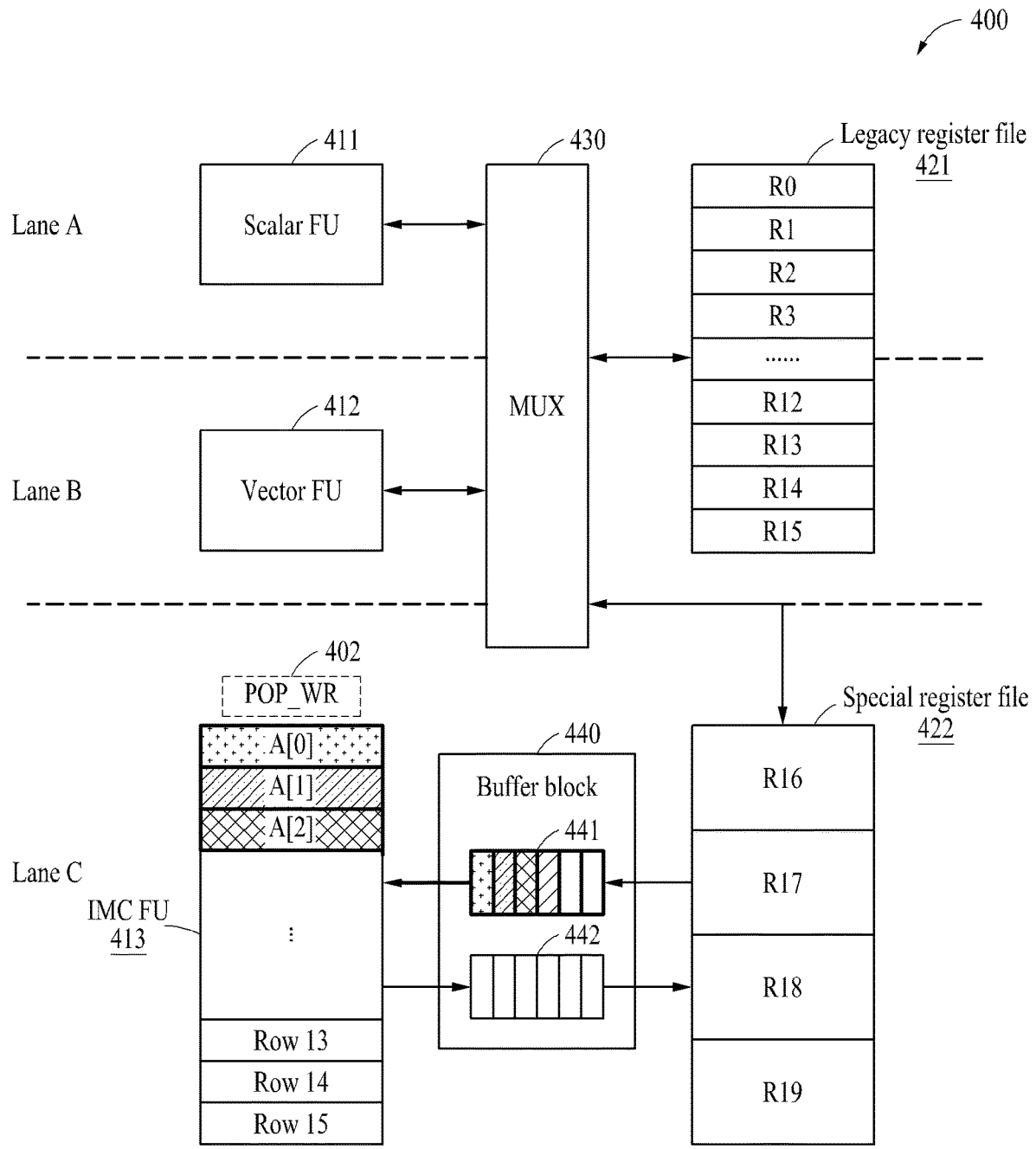

FIGS. 4A and 4B illustrate examples of storing memory input data in an in-memory computing (IMC) function unit (FU) using a legacy FU, according to one or more embodiments. Referring to FIGS. 4A and 4B, a DSP 400 may include a scalar FU 411, a vector FU 412, an IMC FU 413, a legacy register file 421, a special register file 422, a MUX 430, and a buffer block 440. The buffer block 440 may include an input buffer 441 and an output buffer 442.

The DSP 400 may provide a transmission path between the legacy FUs and the special register file 422, and that transmission path may be used for the legacy FUs to store memory input data in the IMC FU 413. When the memory input data is loaded into the special register file 422, the memory input data may be stored in a memory cell array of the IMC FU 413 through the buffer block 440. The memory input data may be data input into the memory cell array of the IMC FU 413, and memory output data may be data generated through the memory cell array of the IMC FU 413.

Referring to FIG. 4A, the scalar FU 411 may execute a load instruction 401. The load instruction 401 may involve instructing the loading of data A from the memory (e.g., data memory 250) into a register R16. The scalar FU 411 may store the data A into the register R16 through the MUX 430 according to the load instruction 401. The data A may correspond to memory input data. The data A in the register R16 may be transmitted to the input buffer 441. In an example, a rule may be defined such that data loaded into each register of the special register file 422 is transmitted to the input buffer 441; the data A may be transmitted from the register R16 to the input buffer 441 according to this rule.

Referring to FIG. 4B, the IMC FU 413 may execute a POP instruction 402. The pop instruction 402 may have the meaning of instructing to retrieve data from the input buffer 441 and deleting the retrieved data from the input buffer 441. The IMC FU 413 may retrieve (and erase) data from the input buffer 441 according to the pop instruction 402 and store the data in the memory cell array of the IMC FU 413. Data transmission may be performed sequentially according to FIFO ordering. For example, when data (A[0]), data (A[1]), and data (A[2]) are sequentially stored in the input buffer 441, the data (A[0]), the data A[1], and the data A[2] may be sequentially transferred to, and stored in, the memory cell array in the same order.

Figure 5:
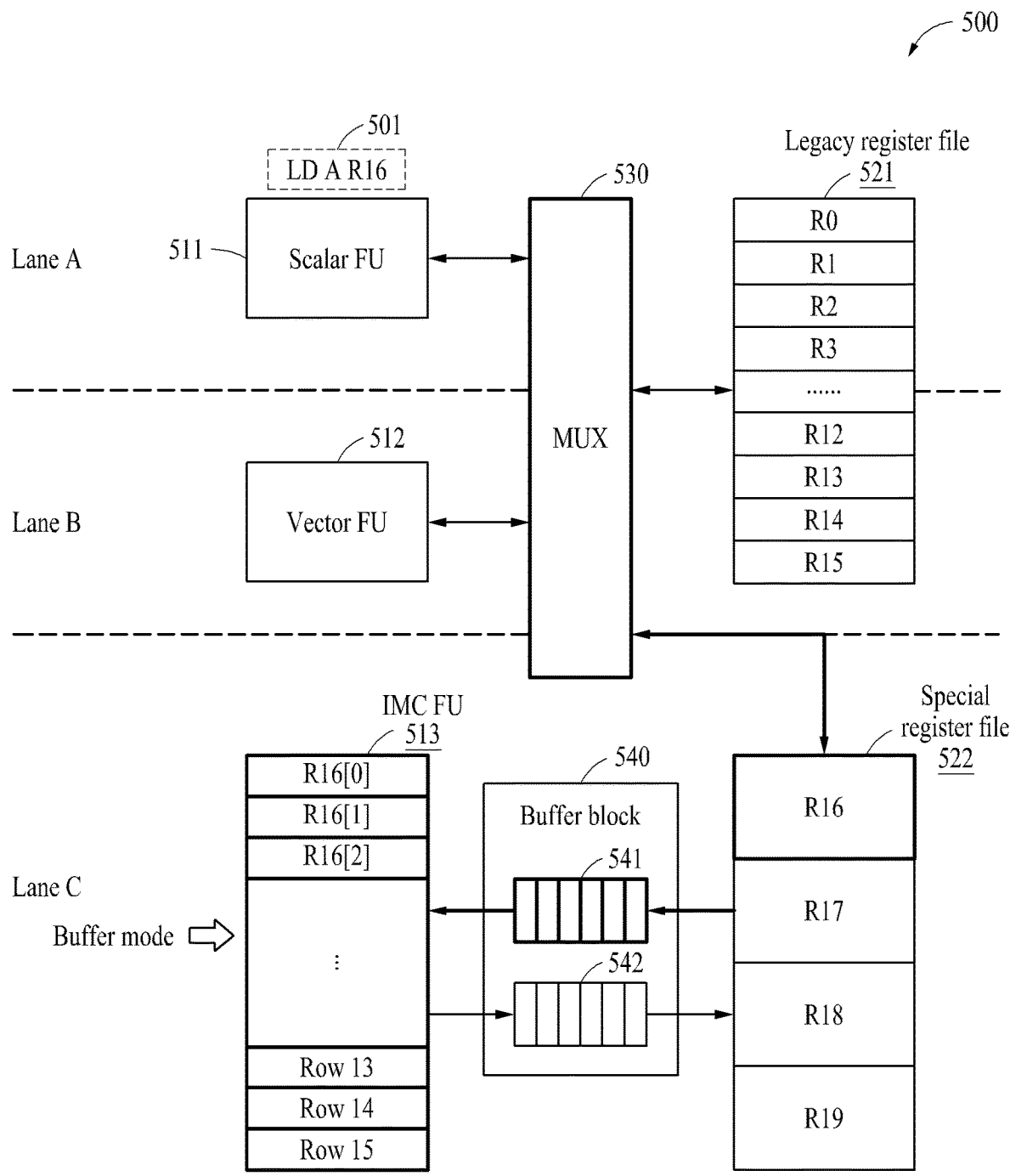
FIG. 5 illustrates an example of storing memory input data in an IMC FU using a buffer mode of the IMC FU, according to one or more embodiments.

FIG. 5 illustrates an example of storing memory input data in an IMC FU using a buffer mode of the IMC FU, according to one or more embodiments. Referring to FIG. 5, a DSP 500 may include a scalar FU 511, a vector FU 512, an IMC FU 513, a legacy register file 521, a special register file 522, a MUX 530, and a buffer block 540. The buffer block 540 may include an input buffer 541 and an output buffer 542.

According to an example, operation modes of the IMC FU 513 may include an operation mode and a buffer mode. The IMC FU 513 may perform an in-memory operation in the operation mode and may operate as a buffer in the buffer mode. When the IMC FU 513 operates in the buffer mode, an effect like increasing the register capacity of the DSP 500 may be achieved. Additional detail of the buffer mode follows.

The scalar FU 511 may execute a load instruction 501. Execution of the load instruction 501 may load data A from the memory into a register R16. The scalar FU 511 may store the data A in the register R16 of the special register file 522 through the MUX 530 according to the load instruction 501. The data A in the register R16 may be transmitted to the input buffer 541. The data A may be transmitted from the register R16 to the input buffer 541 according to a predetermined rule. In the buffer mode, the input buffer 541 may be configured to automatically transmit the data A from the input buffer 541 to the IMC FU 513. Accordingly, the data A may be automatically transmitted to the IMC FU 513. For example, when a series of data R16[0], R16[1], and R16[2] including the data A are loaded into the register R16, the data R16[0], R16[1], and R16[2] may be sequentially stored in the IMC FU 513 through the input buffer 541. In the buffer mode, data in the input buffer 541 may be transmitted to the IMC FU 513 without an explicit instruction such as a pop instruction of the IMC FU 513 (e.g., based on a clock cycle/interval).

Figure 6:
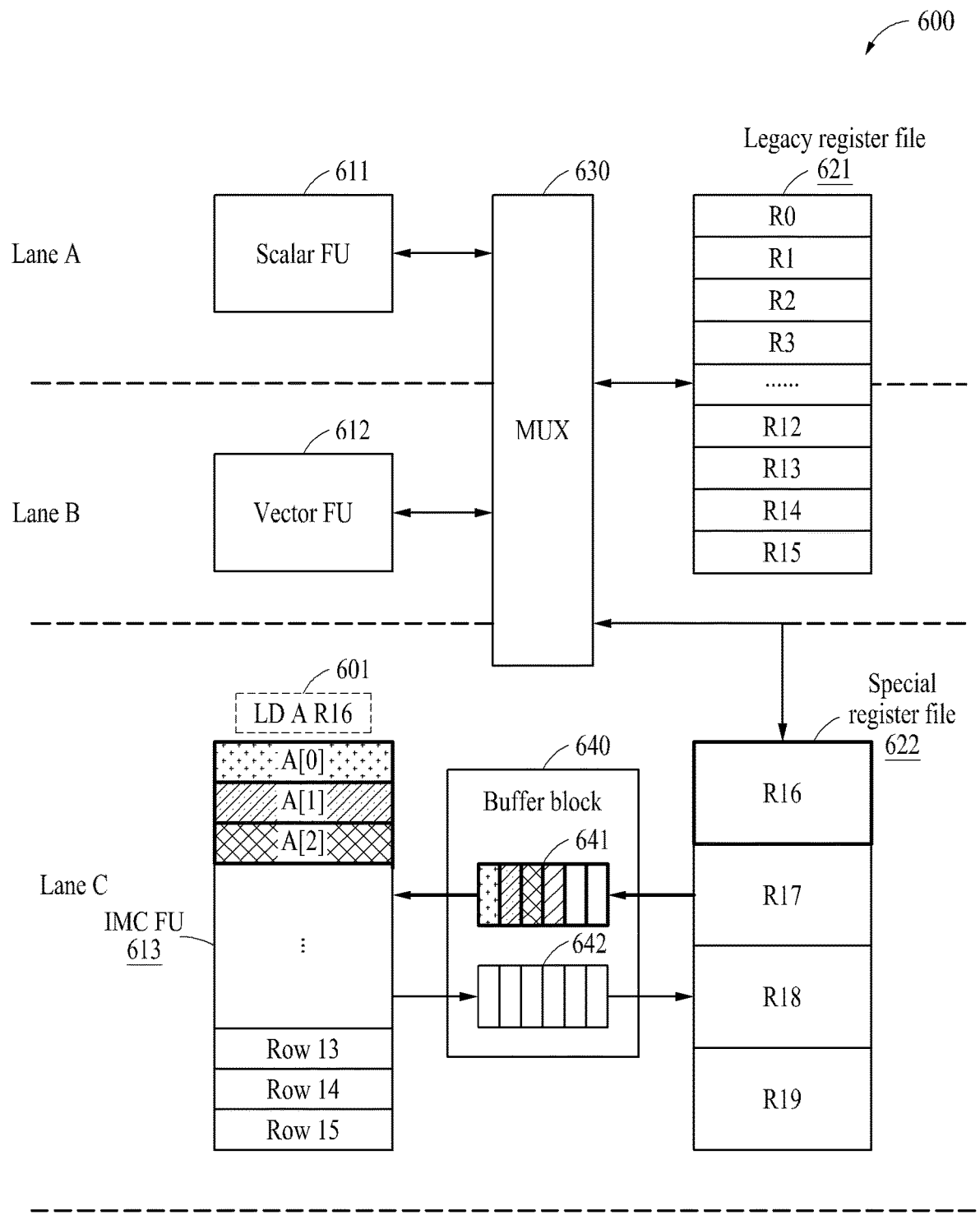
FIG. 6 illustrates an example of storing memory input data using an additional configuration of an IMC FU, according to one or more embodiments.

FIG. 6 illustrates an example of storing memory input data using an additional configuration of an IMC FU, according to one or more embodiments. Referring to FIG. 6, a DSP 600 may include a scalar FU 611, a vector FU 612, an IMC FU 613, a legacy register file 621, a special register file 622, a MUX 630, and a buffer block 640. The buffer block 640 may include an input buffer 641 and an output buffer 642.

According to an example, a separate load/store unit may be included in a lane C in which the IMC FU 613 is disposed. If there is no separate load/store unit in the lane C, a load/store unit of a lane (e.g., a lane A or a lane B) of a legacy FU may be used to load data into the special register file 622 of the lane C. FIGS. 4A, 4B, and 5 show examples in which there is no separate load/store unit in the lane C. If there is a separate load/store unit in the lane C, data may be loaded into the special register file 622 through the load/store unit of the lane C. FIG. 6 shows an example in which there is a separate load/store unit in the lane C.

The IMC FU 613 may execute a load instruction 601. Execution of the load instruction 601 may load data A from the memory into a register R16. The IMC FU 613 may store data A in the register R16 of the special register file 622 according to the load instruction 601. Specifically, the data A in the register R16 may be transmitted to the input buffer 641. The data A may be transmitted from the register R16 to the input buffer 641 according to a predetermined rule. According to the load instruction 601, data A[0], A[1], and A[2] in the input buffer 641 may be sequentially stored in a memory cell array of the IMC FU 613 according to FIFO.

Figure 7A:
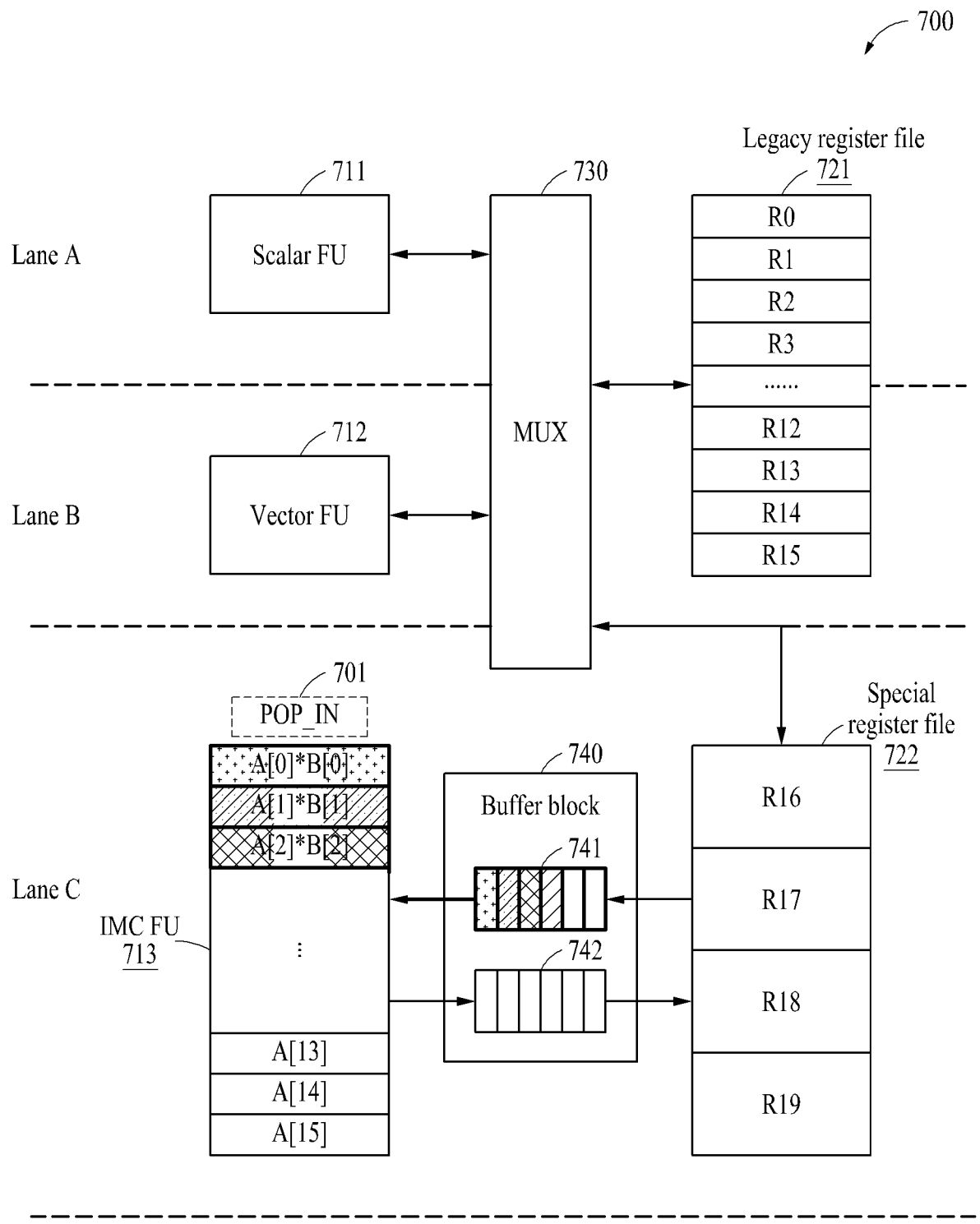
FIGS. 7A and 7B illustrate examples of a multiply-accumulate (MAC) operation of an IMC FU, according to one or more embodiments.
Figure 7B:
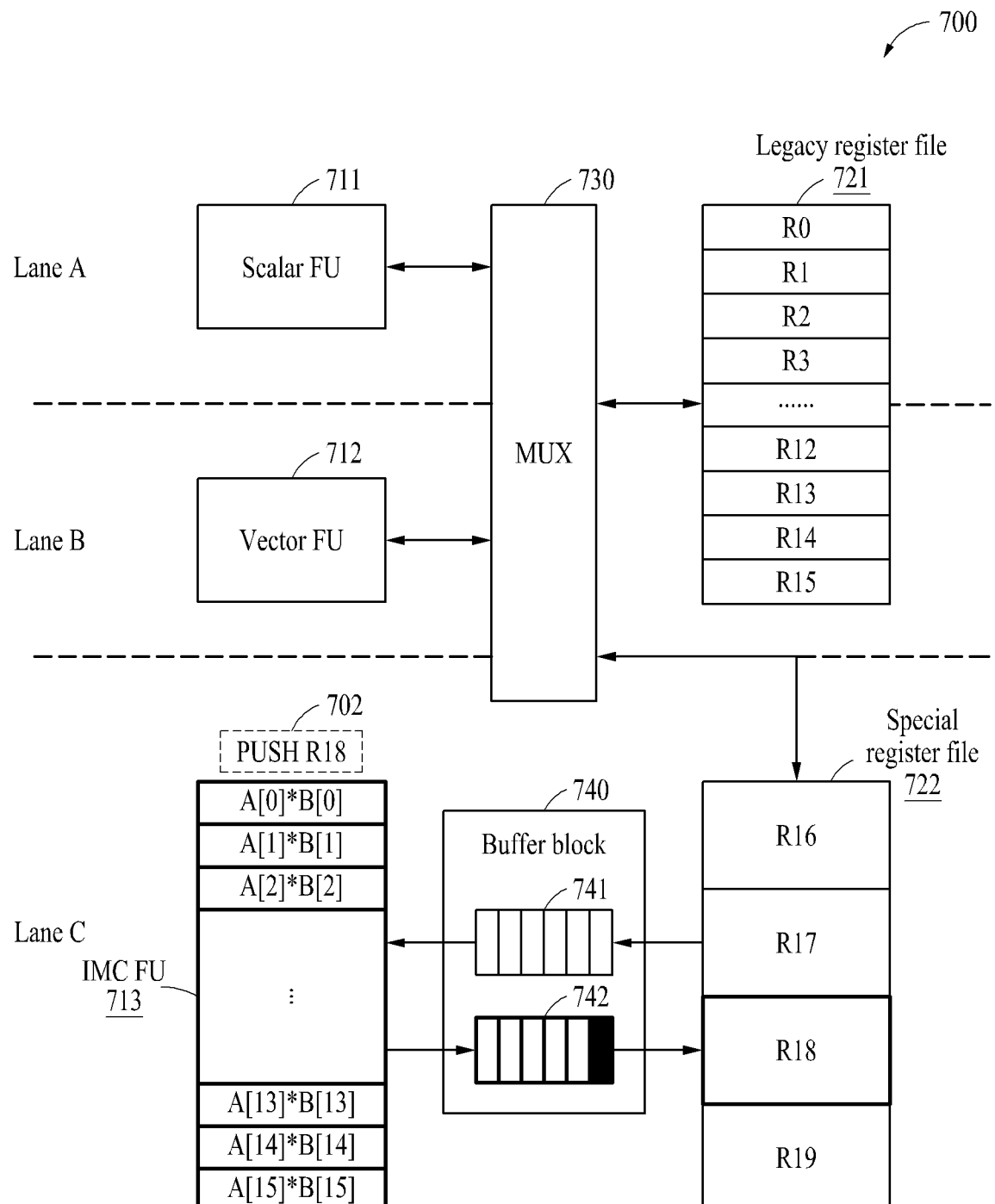

FIGS. 7A and 7B illustrate examples a multiply-accumulate (MAC) operation of an IMC FU, according to one or more embodiments. Referring to FIGS. 7A and 7B, a DSP 700 may include a scalar FU 711, a vector FU 712, an IMC FU 713, a legacy register file 721, a special register file 722, a MUX 730, and a buffer block 740. The buffer block 740 may include an input buffer 741 and an output buffer 742.

The IMC FU 713 may have an in-memory operation architecture using a memory cell array and may perform a MAC operation through the in-memory operation architecture (i.e., performing a MAC operation on data that is in the IMC FU 713 before, during and after the MAC operation). The MAC operation may be performed in two stages. In a first stage, first memory input data may be stored in the IMC FU 713, and then, in a second stage, second memory input data may be applied to the IMC FU 713. The IMC FU 713 may perform a MAC operation between the first memory input data and the second memory input data as the second memory input data is applied to the IMC FU 713. For example, large-scale MAC operations between weight data and input feature data (when executing a neural network operation such as inference) may be efficiently performed by the IMC FU 713.

Memory input data (data from main/host memory) used for MAC operations for executing the neural network may include weight data (weights of neural network nodes) and input feature data (e.g., a feature map). The weight data may also be referred to as network weight data, and the input feature data may also be referred to as network input data. When network input data is input into the IMC FU 713 in a state in which network weight data is already stored in the memory cell array, the IMC FU 713 may generate network output data by performing a MAC operation between the network weight data and the network input data. A representative example of applying network input data to the IMC FU 713 after storing network weight data in the IMC FU 713 is described below. However, an example of applying network weight data to the IMC FU 713 after storing network input data in the IMC FU 713 is also possible.

Referring to FIG. 7A, a series of data B[0] to B[2] may be applied to the memory cell array of the IMC FU 713 in a state in which data A[0] to A[15] are already stored in the memory cell array. The data A[0] to A[15] may correspond to network weight data, and the data B[0] to B[2] may correspond to network input data. The data A[0] to A[15] may be stored in the IMC FU 613 as by any of the operations of storing memory input data described with reference to FIGS. 4A, 4B, 5, and 6. The IMC FU 713 may execute a POP instruction 701. According to the pop instruction 701, the data B[0] to B[2] in the input buffer 741 may be input into the memory cell array of the IMC FU 713. The data input may be performed sequentially according to FIFO ordering.

Referring to FIG. 7B, data A[0]*B[0] to A[15]*B[15] may be generated by to an in-memory operation. The data A[0]*B[0] to A[15]*B[15] may correspond to intermediate results of a multiplication operation, and a final result of a MAC operation may be generated by accumulating the data A[0]*B[0] to A[15]*B[15] in the process of outputting each of the data A[0]*B[0] to A[15]*B[15]. The IMC FU 713 may execute a push instruction 702. According to the push instruction 702, the result (of the accumulation of data A[0]*B[0] to A[15]*B[15]) into the output buffer 742. The output buffer 742 may transmit the result to a register (e.g., a register R18) of the special register file 722. Data transmission may be performed sequentially according to FIFO ordering.

Figure 8A:
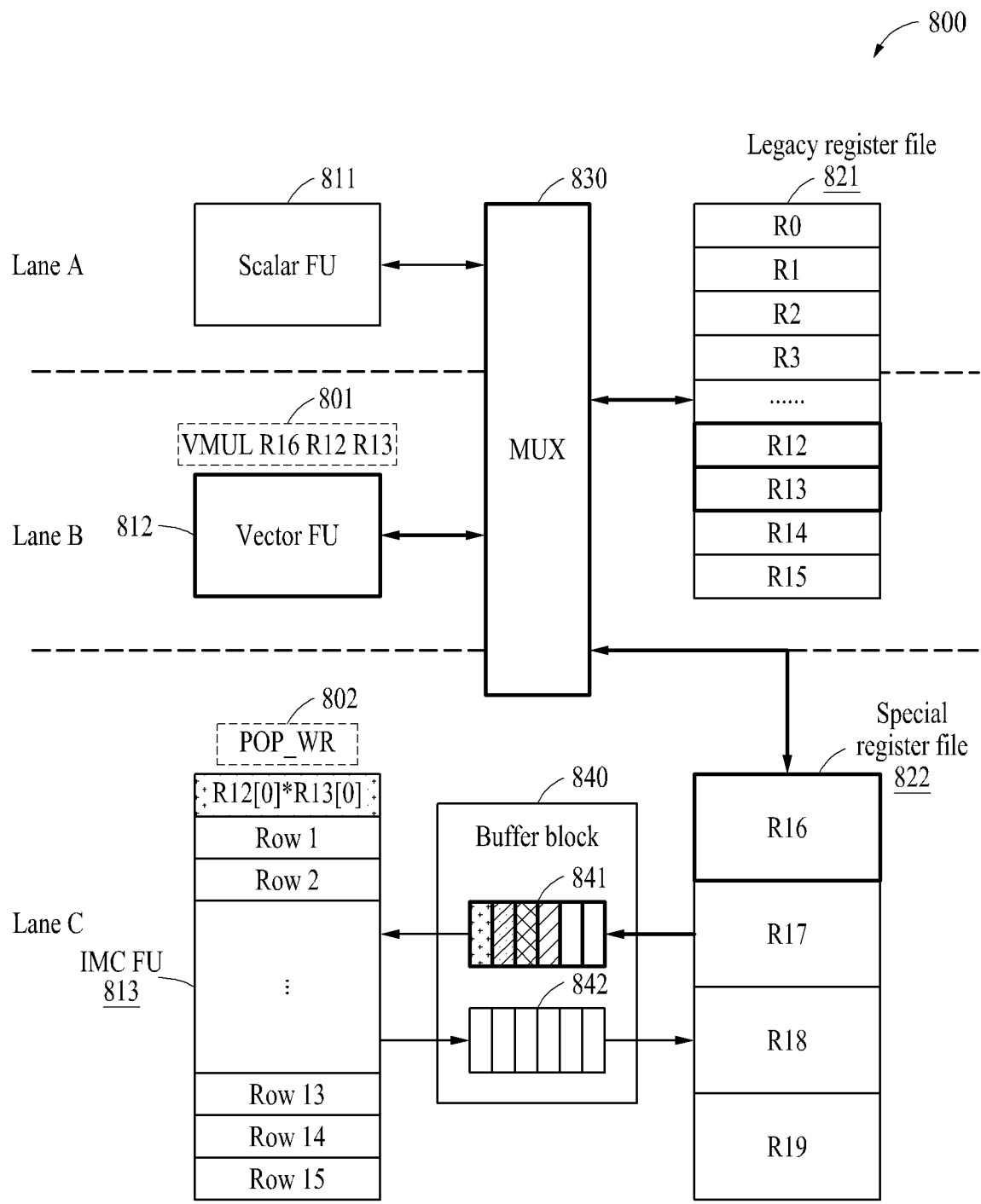
FIGS. 8A and 8B illustrate examples of a combined operation using a legacy FU and an IMC FU, according to one or more embodiments.
Figure 8B:
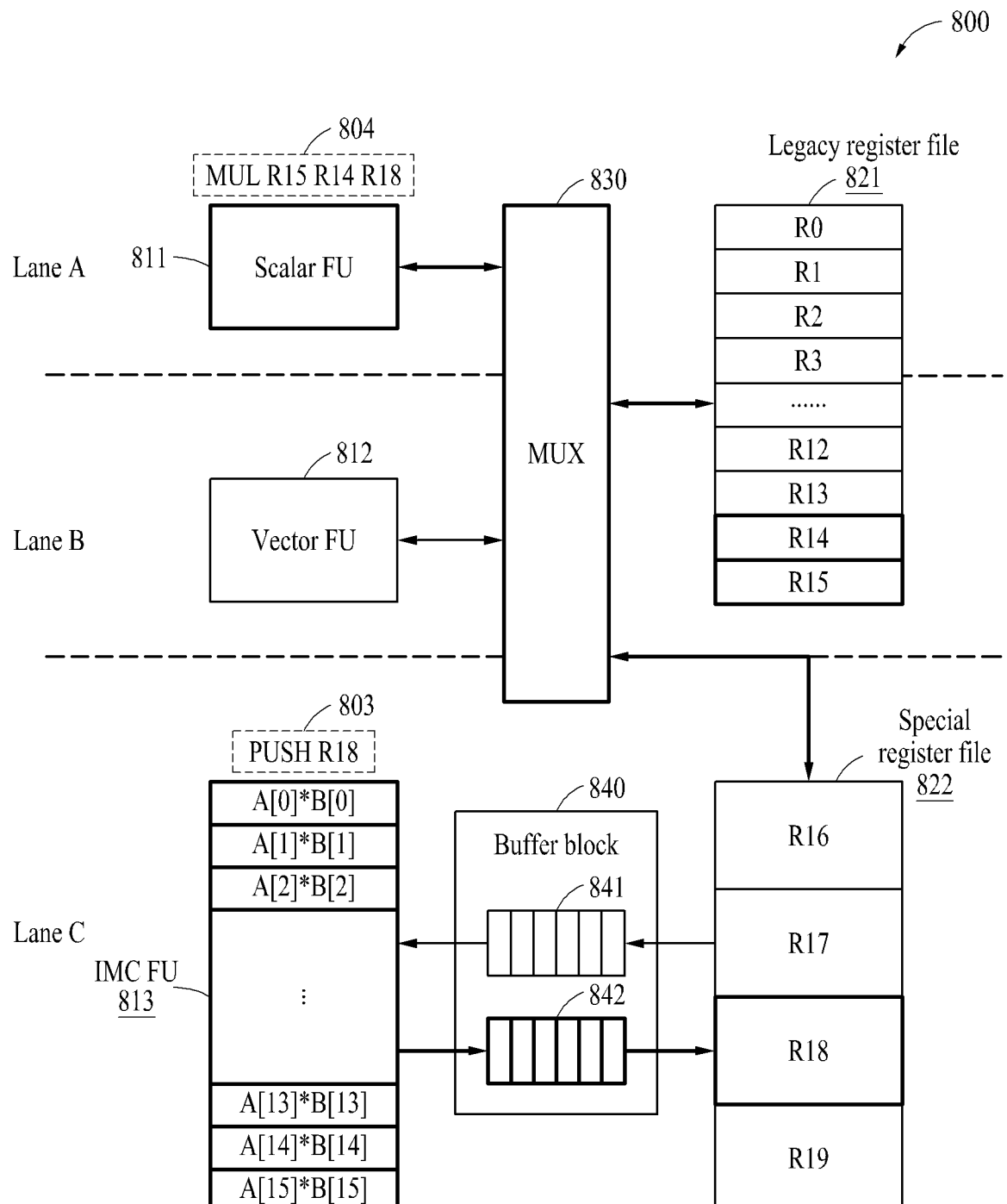

FIGS. 8A and 8B illustrate examples of a combined operation using a legacy FU and an IMC FU, according to one or more embodiments. Referring to FIG. 8A, a DSP 800 may include a scalar FU 811, a vector FU 812, an IMC FU 813, a legacy register file 821, a special register file 822, a MUX 830, and a buffer block 840. The buffer block 840 may include an input buffer 841 and an output buffer 842.

A combined operation may refer to a type of operation in which a plurality of FUs are continuously involved in an operation on data until a result of an operation based on the data is stored in a memory after the data is loaded from the memory. More specifically, a legacy FU (e.g., the scalar FU 811 or the vector FU 812) may perform a first operation and store a first operation result in a register file (e.g., the legacy register file 821 or the special register file 822), and the IMC FU 813 may perform a second operation based on the first operation result. In this case, the first operation and the second operation may constitute a combined operation. In some cases, the first and second operations may be performed according to instructions in a same VLIW instruction bundle.

The combined operation may be performed in various forms. Referring to FIG. 8A, the vector FU 812 may, according to a first instruction 801, perform a first operation (e.g., a vector multiplication) between data in a register R12 and data in a register R13 and store a first operation result of the first operation in a register R16. The first operation result in the register R16 may be transmitted to the input buffer 841. The IMC FU 813 may, according to a second instruction 802, receive data R12[0]*R13[0] (corresponding to at least a portion of the first operation result) from the input buffer 841 and store the received data R12[0]*R13[0] in a memory cell array of the IMC FU 813.

Referring to FIG. 8B, according to a third instruction 803, the IMC FU 813 may store data A[0]*B[0] to A[15]*B[15] in the register R18 through the output buffer 842. The data A[0]*B[0] to A[15]*B[15] may be generated according to an in-memory operation. The data A[0]*B[0] to A[15]*B[15] may correspond to intermediate results of a multiplication operation, and a final result of a MAC operation may be generated by accumulating the data A[0]*B[0] to A[15]*B[15]. The MAC operation may correspond to the first operation, and the final result may correspond to the first operation result. The first operation result corresponding to the final result may be stored in the register R18 through the output buffer 842. The scalar FU 811 may, according to a fourth instruction 804, perform a second operation (e.g., a scalar multiplication) between data in a register R14 and the data in the register R18 and store a second operation result in a register R15.

With this type of combined operation, the first operation result may be used for the second operation without having to be transferred to and stored in the memory (e.g., host/main memory). Accordingly, the combined operation may reduce memory accesses and improve the operation speed.

Figure 9A:
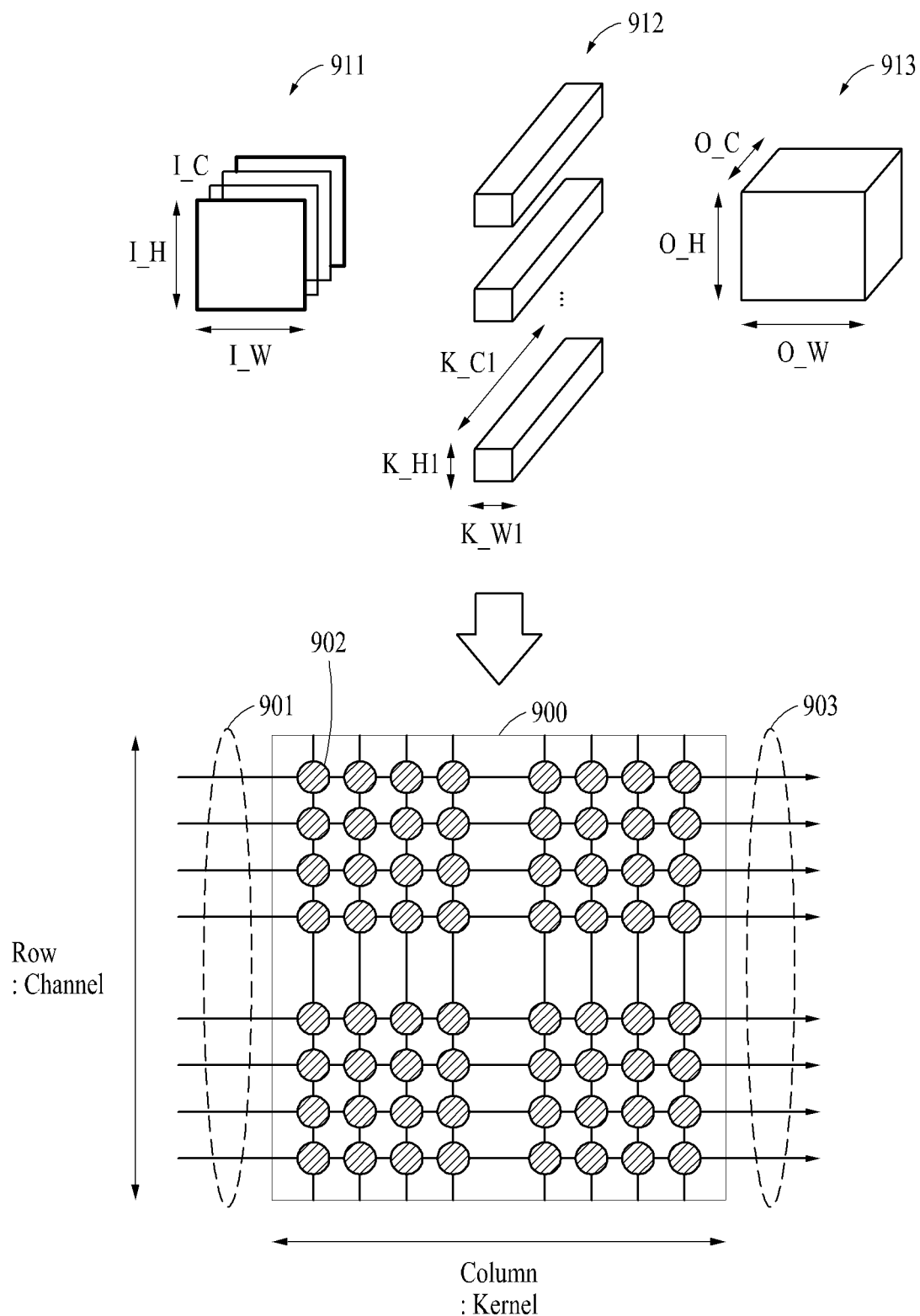
FIGS. 9A and 9B illustrate a difference between a legacy convolution operation and a depth-wise separable convolution (DSC) operation, according to one or more embodiments.
Figure 9B:
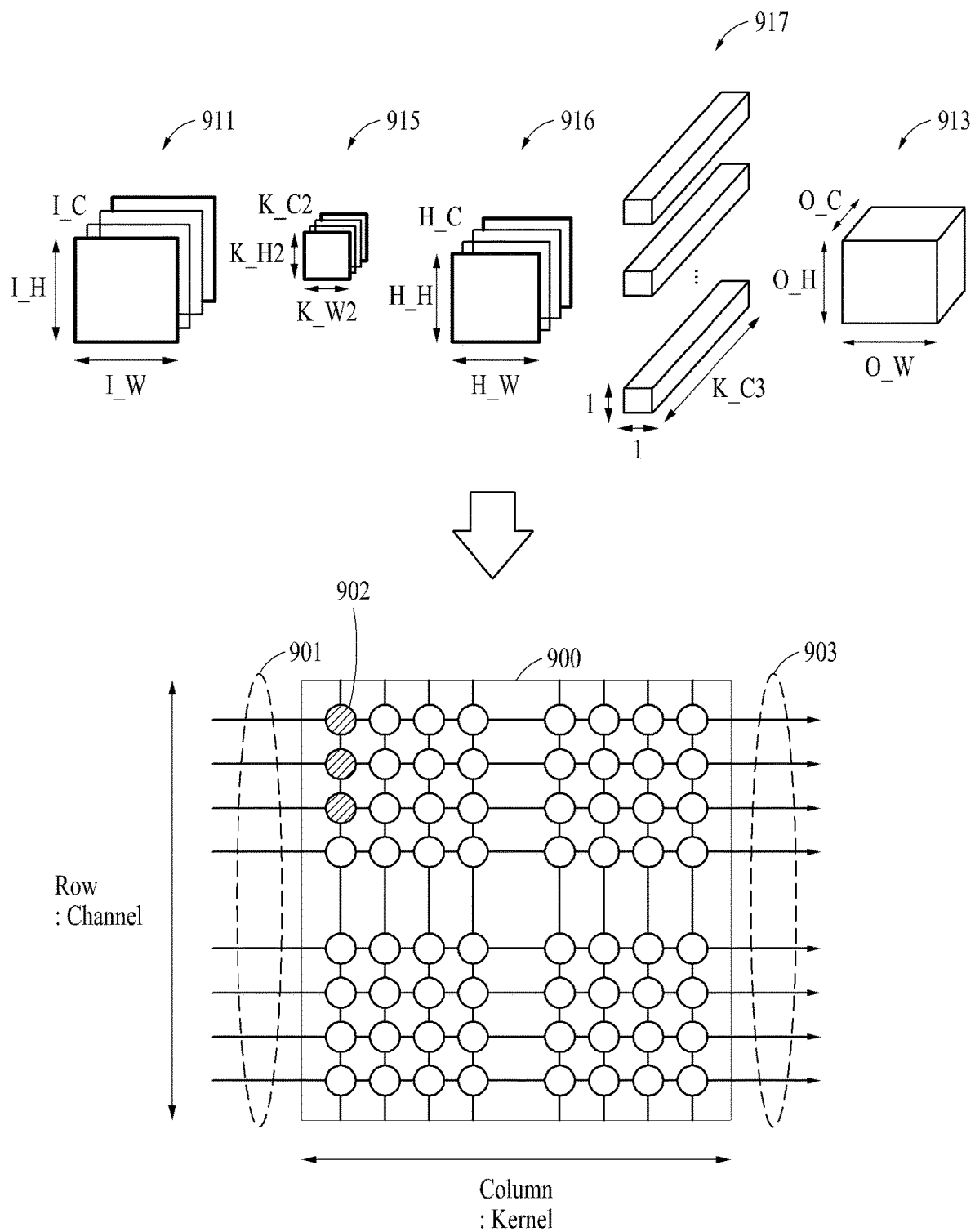

FIGS. 9A and 9B illustrate a difference between a legacy convolution operation and a depth-wise separable convolution (DSC) operation, according to one or more embodiments. Referring to FIG. 9A, an output feature map 913 may be generated according to a legacy convolution operation between an input feature map 911 and a weight kernel 912. The input feature map 911 may have dimensions of I_W*I_H*I_C ("W", "H", and "C" referring to width, height, and color(s), respectively), each individual kernel of the weight kernel 912 may have dimensions of K_W1*K_H1*K_C1, and the output feature map 913 may have dimensions of O_W*O_H*O_C. The weight kernel 912 may include "O_C" individual kernels.

A memory cell array 900 of memory cells 902 may store weight data of the weight kernel 912. A row direction of the memory cell array 900 may correspond to a channel direction of the weight kernel 912, and a column direction of the memory cell array 900 may correspond to a kernel direction of the weight kernel 912. Data in each channel of the individual kernels may be stored in the channel direction, and each individual kernel may be stored in the kernel direction. For example, weight values of a first channel of each individual kernel may be stored in a first column, and weight values of a second channel of each individual kernel may be stored in a second column. Weight values of channels of a first individual kernel may be stored in a first row, and weight values of channels of a second individual kernel may be stored in a second row. This example is under the assumption that one channel is stored in one column and one individual kernel is stored in one row. However, it may also be possible that one channel is stored across multiple columns, or one individual kernel is stored across multiple columns.

In a state in which weight data is stored in the memory cells 902, input data corresponding to the input feature map 911 may be applied to the memory cell array 900 through an input section 901. A MAC operation between the input data and the weight data may be performed through IMC of the memory cell array 900. A MAC operation result may be output through an output section 903. The output feature map 913 may be determined based on the MAC operation result.

Referring to FIG. 9B, a DSC operation corresponding to the legacy convolution operation of FIG. 9A may be performed. A hidden map 916 may be generated according to a depth-wise convolution operation between the input feature map 911 and a first weight kernel 915. The first weight kernel 915 may include "K_C2" individual kernels, and each individual kernel of the first weight kernel 915 may have dimensions of K_W2*K_H2*1. The hidden map 916 may have dimensions of H_W*H_H*H_C. I_C, K_C2, and H_C may be the same value.

An output feature map 913 may be generated according to a point-wise convolution operation between the hidden map 916 and a second weight kernel 917. The second weight kernel 917 may include "O_C" individual kernels, and each individual kernel of the second weight kernel 917 may have dimensions of 1*1*K_C3. The first weight kernel 915 and the second weight kernel 917 may correspond to results obtained by modifying the weight kernel 912 of FIG. 9A to be suitable for DSC.

When the memory cell array 900 is used for DSC, the depth-wise convolution operation and the point-wise convolution operation may be performed through the memory cell array 900. The depth-wise convolution operation between the input feature map 911 and the first weight kernel 915 may include an individual convolution operation between (i) an individual map of each channel of the input feature map 911 and (ii) each individual kernel of the first weight kernel 915. In the in-memory operation architecture, input data should be applied to the memory cell array 900 in a state in which as much weight data as possible is stored in the memory cells 902 to increase the usage efficiency of the memory cell array 900. In the case of the depth-wise convolution operation, an individual map of a corresponding channel of the input feature map 911 may be applied in a state in which each individual kernel of the first weight kernel 915 is stored, and in general, an individual kernel has a considerably small size compared to the memory cell array 900, and thus, the usage efficiency of the memory cell array 900 may not be high.

Figure 10A:
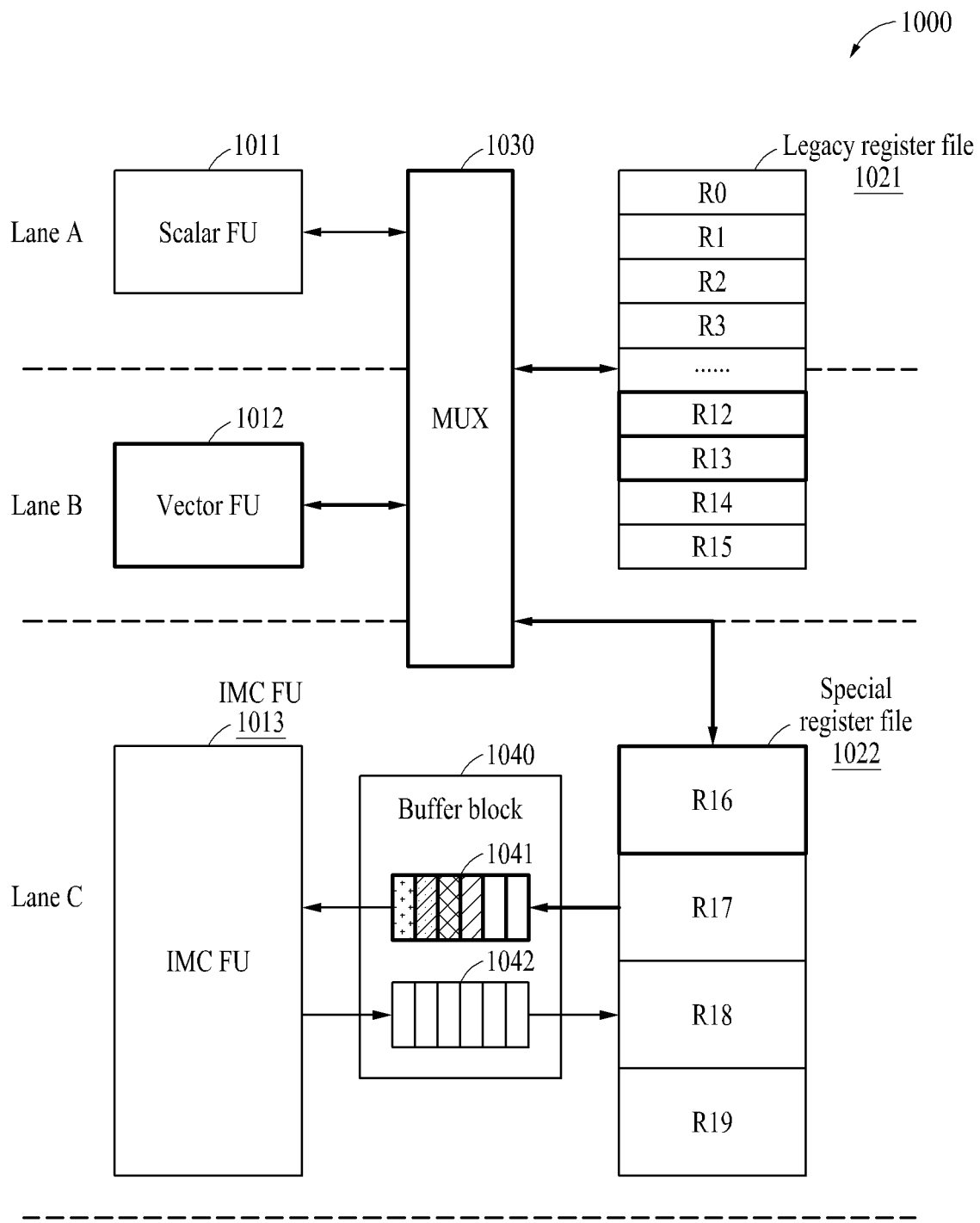
FIGS. 10A and 10B illustrate examples of a DSC operation using a combined operation, according to one or more embodiments.
Figure 10B:
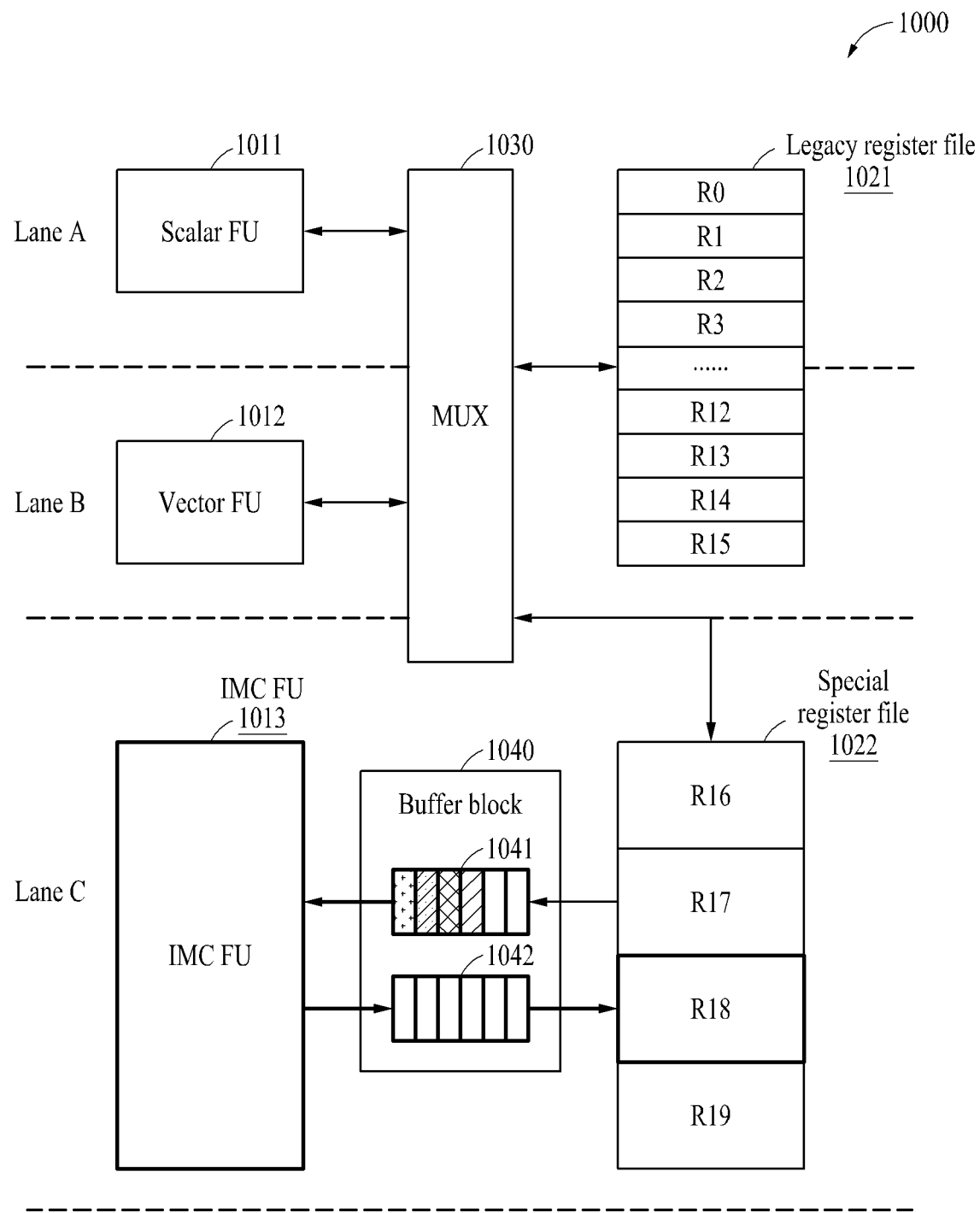

FIGS. 10A and 10B illustrate examples of a DSC operation using a combined operation. A combined operation may be a type of operation in which multiple FUs are continuously involved in an operation on data until a result of an operation based on the data is stored in a memory after the data is loaded from the memory. For example, a first FU may perform a first operation and store a first operation result in a register file, and a second FU may perform a second operation based on the first operation result. An operation (e.g., a depth-wise convolution of DSC) exhibiting low utilization of a memory cell array of an IMC FU 1013 may be processed by a legacy FU (e.g., a scalar FU 1011 or a vector FU 1012), and an operation (e.g., a point-wise convolution of DSC) exhibiting high utilization of the memory cell array may be processed by the IMC FU 1013.

Referring to FIGS. 10A and 10B, a DSP 1000 may include the scalar FU 1011, the vector FU 1012, the IMC FU 1013, a legacy register file 1021, a special register file 1022, a MUX 1030, and a buffer block 1040. The buffer block 1040 may include an input buffer 1041 and an output buffer 1042.

Referring to FIG. 10A, the vector FU 1012 may perform a depth-wise convolution. Input data in an input feature map and weight data in a first weight kernel may be stored in registers (e.g., registers R12, R13) of the legacy register file 1021, and a depth-wise convolution between the input data and weight data in the registers may be performed. An operation result may be stored in a register (e.g., a register R16) of the special register file 1022. The operation result may correspond to hidden data in a hidden map. The operation result may be applied to the memory cell array of the IMC FU 1013 through the input buffer 1041. The vector FU 1012 may perform a depth-wise convolution between more data in the input feature map and more data in the weight kernel, and as a result, more hidden data may be applied to the memory cell array of the IMC FU 1013.

Referring to FIG. 10B, the IMC FU 1013 may perform a point-wise convolution. Weight data in a second weight kernel may be stored in the memory cell array of the IMC FU 1013. Hidden data may be applied to the memory cell array in a state in which the weight data is stored in the memory cell array. The IMC FU 1013 may perform a point-wise convolution between the weight data and the hidden data. An output of the IMC FU 1013 may be stored in registers (e.g., a register R18) of the special register file 1022 through the output buffer 1042. The output of the IMC FU 1013 may correspond to output data in an output feature map.

Figure 11A:
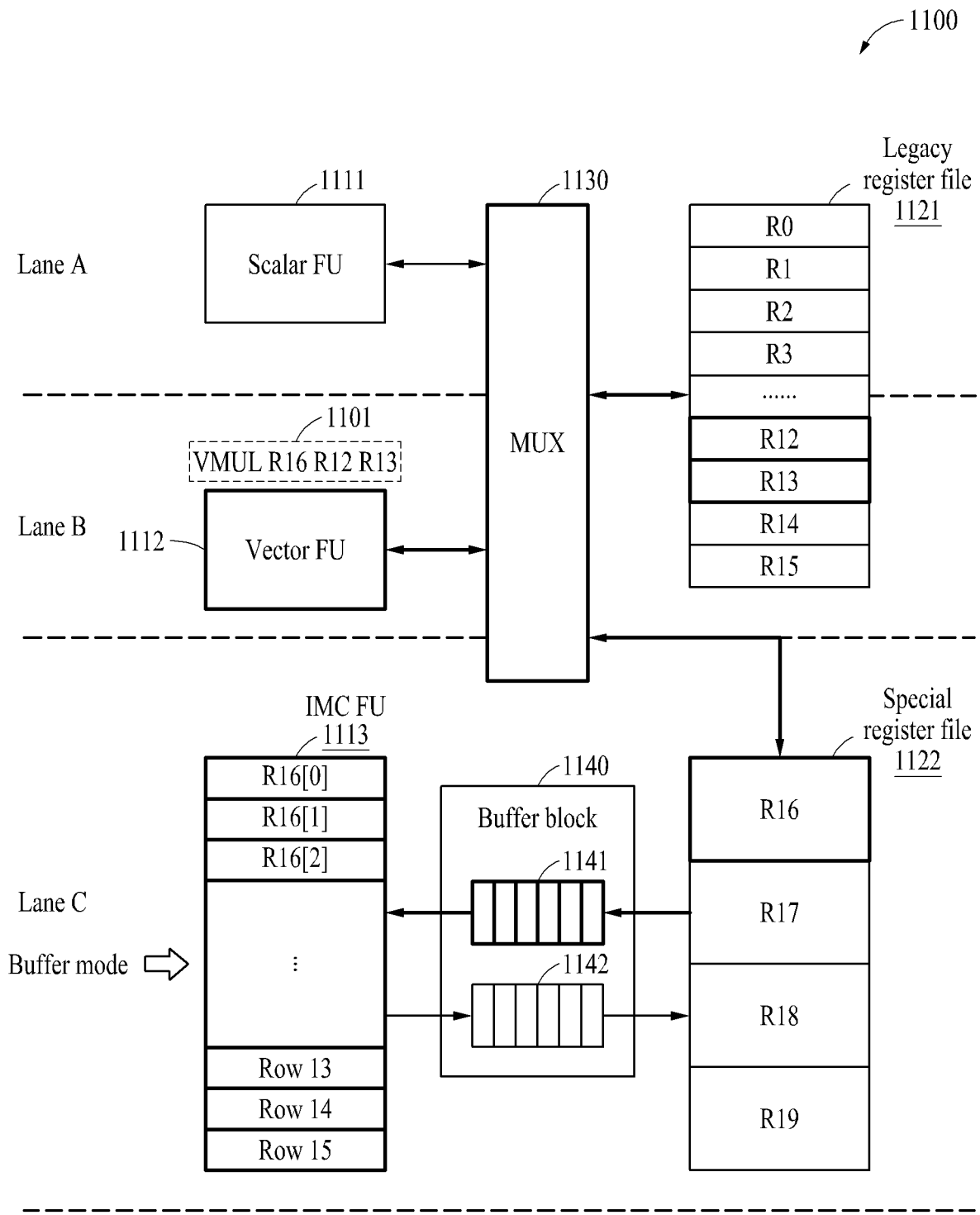
FIGS. 11A and 11B illustrate examples of a buffer mode of an IMC FU, according to one or more embodiments.
Figure 11B:
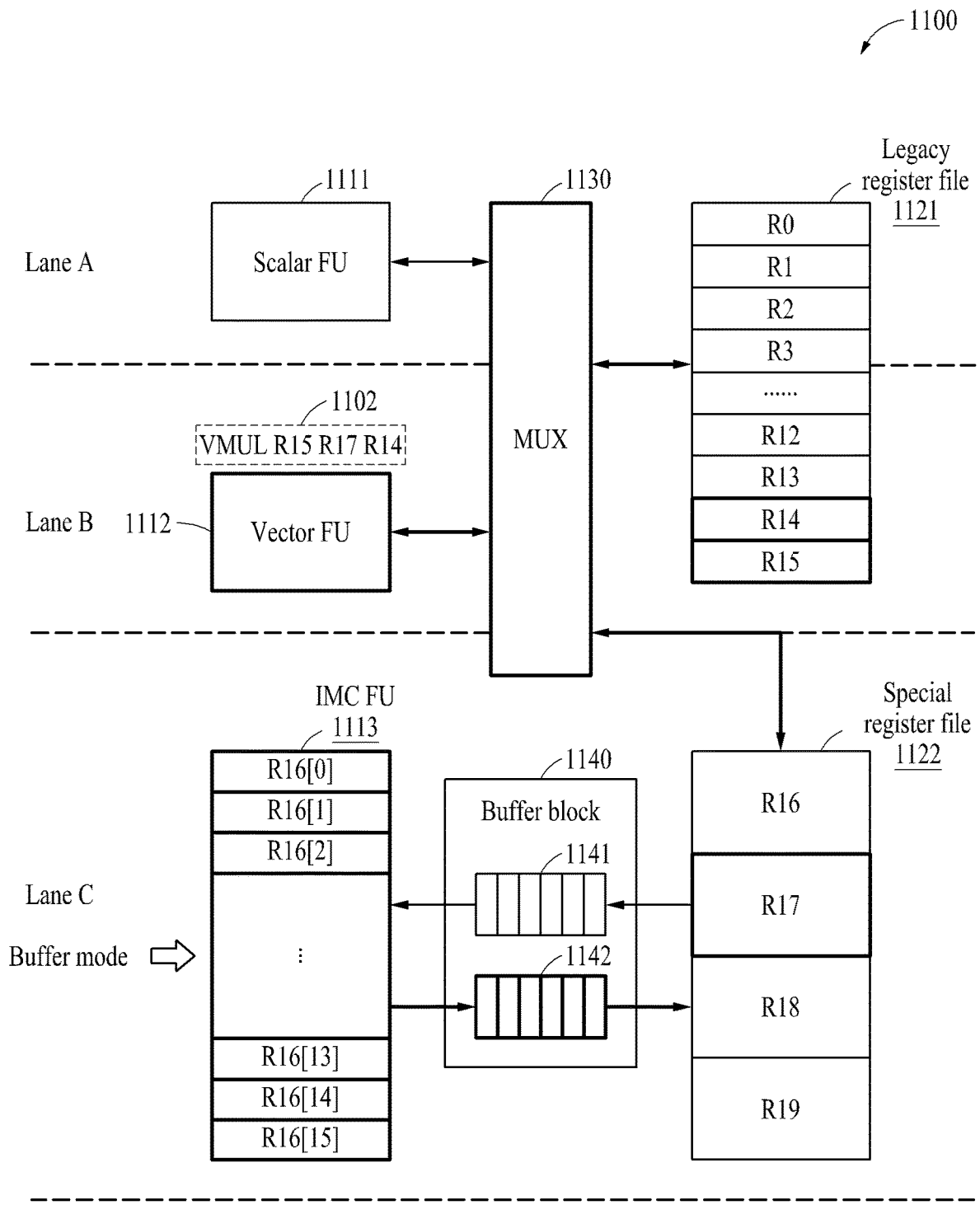

FIGS. 11A and 11B illustrate examples of a buffer mode of an IMC FU, according to one or more embodiments. Referring to FIGS. 11A and 11B, a DSP 1100 may include a scalar FU 1111, a vector FU 1112, an IMC FU 1113, a legacy register file 1121, a special register file 1122, a MUX 1130, and a buffer block 1140. The buffer block 1140 may include an input buffer 1141 and an output buffer 1142. Operation modes of the IMC FU 1113 may include an operation mode and a buffer mode. The IMC FU 1113 may perform an in-memory operation in the operation mode and may operate as a buffer in the buffer mode. The IMC FU 1113 may operate in the buffer mode according to a buffer instruction (e.g., IMC_BUF_ON). When the IMC FU 1113 operates in the buffer mode, an effect like increasing the register capacity of the DSP 1100 may be achieved. In the buffer mode, the memory cells of the IMC FU 1113 may be used as a buffer for operations of the legacy FUs (e.g., scalar FU 1111 and vector FU 1112), and which may provide performance benefits (e.g., low latency) because of the proximity of the IMC UF 1113 to the legacy FUs.

Referring to FIG. 11A, the vector FU 1112 may execute a vector multiplication instruction 1101. Execution of the vector multiplication instruction 1101 may involve performing a vector multiplication between data in register R12 and data in register R13 and store a corresponding operation result of the vector multiplication in register R16. The vector multiplication may be performed by the vector FU 1112 according to the vector multiplication instruction 1101. The operation result may be transmitted to the input buffer 1141. Registers (e.g., the registers R12, R13, and R16 of the vector multiplication instruction 1101) to be used for input and/or output when an instruction such as the vector multiplication instruction 1101 is called may be declared, and the IMC FU 1113 may be utilized as a memory device through such registers.

In the buffer mode, a buffering function of the buffer block 1140 may be bypassed. To elaborate, the buffer block 1140 may automatically pass, in FIFO order, values received from a previous block to a subsequent block. In the buffer mode, the input buffer 1141 may be configured to automatically transmit data inputted thereto to the IMC FU 1113. Accordingly, an operation result may be automatically transmitted to the IMC FU 1113. For example, when a series of data R16[0], R16[1], and R16[2] are loaded into the register R16 one after the other, the data R16[0], R16[1], and R16[2] may be sequentially stored in the IMC FU 1113 through the input buffer 1141. In the buffer mode, data in the input buffer 1141 may be transmitted to the IMC FU 1113 without an explicit instruction such as a pop instruction of the IMC FU 1113 (the input buffer 1141 may serve only as a transit point and may not perform buffering).

Referring to FIG. 11B, the vector FU 1112 may execute a vector multiplication instruction 1102 to perform a vector multiplication between data in a register R17 and data in a register R14 and store an operation result of the vector multiplication in a register R15.

The data in the register R17 may be provided from the IMC FU 1113 via the output buffer 1142. As noted above, in the buffer mode, the IMC FU 1113 may provide the data stored in the IMC FU 1113 to the output buffer 1142. In the buffer mode, the output buffer 1142 may be configured to automatically transmit the data input thereto to the special register file 1122. Accordingly, buffer data may be automatically transmitted to the special register file 1122. For example, a series of data R16[0] to R16[15] in the IMC FU 1113 may be sequentially transmitted to the special register file 1122 through the output buffer 1142. In the buffer mode, the data in the IMC FU 1113 may be transmitted to the output buffer 1142 without an explicit instruction such as a push instruction of the IMC FU 1113.

Figure 12:
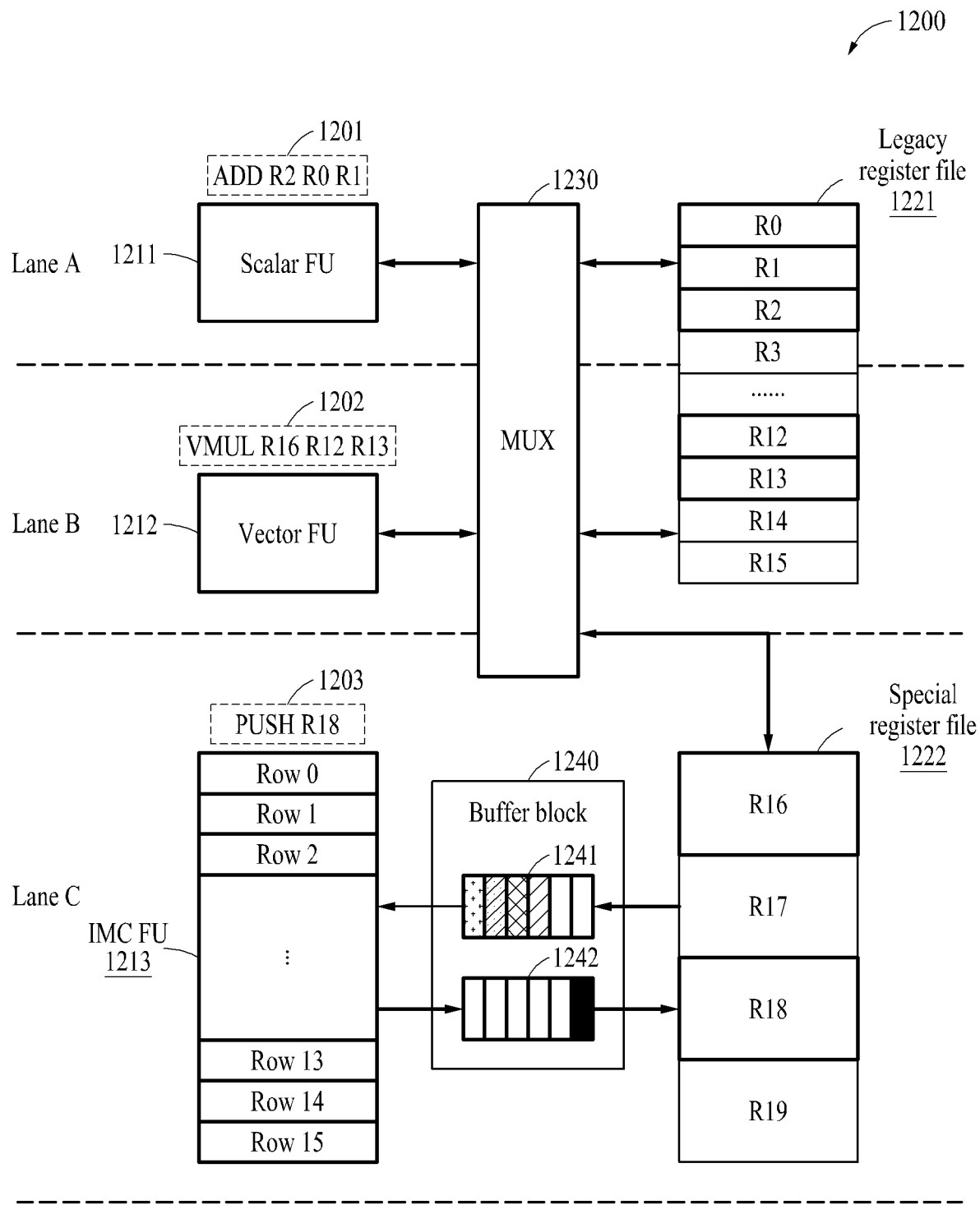
FIG. 12 illustrates an example of an independent operation of each lane, according to one or more embodiments.

FIG. 12 illustrates an example of an independent operation of each lane, according to one or more embodiments. A DSP 1200 may include a scalar FU 1211, a vector FU 1212, an IMC FU 1213, a legacy register file 1221, a special register file 1222, a MUX 1230, and a buffer block 1240. The buffer block 1240 may include an input buffer 1241 and an output buffer 1242. The IMC FU 1213 may include an operation mode and a buffer mode. The example shown in FIG. 12 is performed with the IMC FU 1213 in the operation mode.

A VLIW packet containing an instruction bundle (of individual instructions) may be received and the instructions in the bundle may be independently processed through lanes (e.g., a lane A, a lane B, and a lane C) of the DSP 1200. Registers (e.g., registers of the legacy register file 1221 and registers of the special register file 1222) necessary for processing each instruction may be operated independently. For example, the instruction bundle may include an addition instruction 1201, a vector multiplication instruction 1202, and a push instruction 1203, which may be expressed as {ADD R2, R0, R1; VMUL R16, R12, R13; PUSH R18}. The instructions 1201, 1202, and 1203 may be processed independently in different respective lanes.

The scalar FU 1211 may execute the addition instruction 1201. In response to the execution of the addition instruction 1201, an addition operation between data in a register R0 and data in a register R1 may be performed, and an operation result of the addition operation may be stored in a register R2. The vector FU 1212 may execute the vector multiplication instruction 1202. In response to the execution of the vector multiplication instruction 1202, a vector multiplication operation of data in a register R12 and data in a register R13 may be performed, and an operation result of the vector multiplication operation may be stored in a register R16. The IMC FU 1213 may execute the push instruction 1203. In response to the execution of the push instruction 1203, output data in the IMC FU 1213 may be stored in a register R18 through the output buffer 1242.

Figure 13:
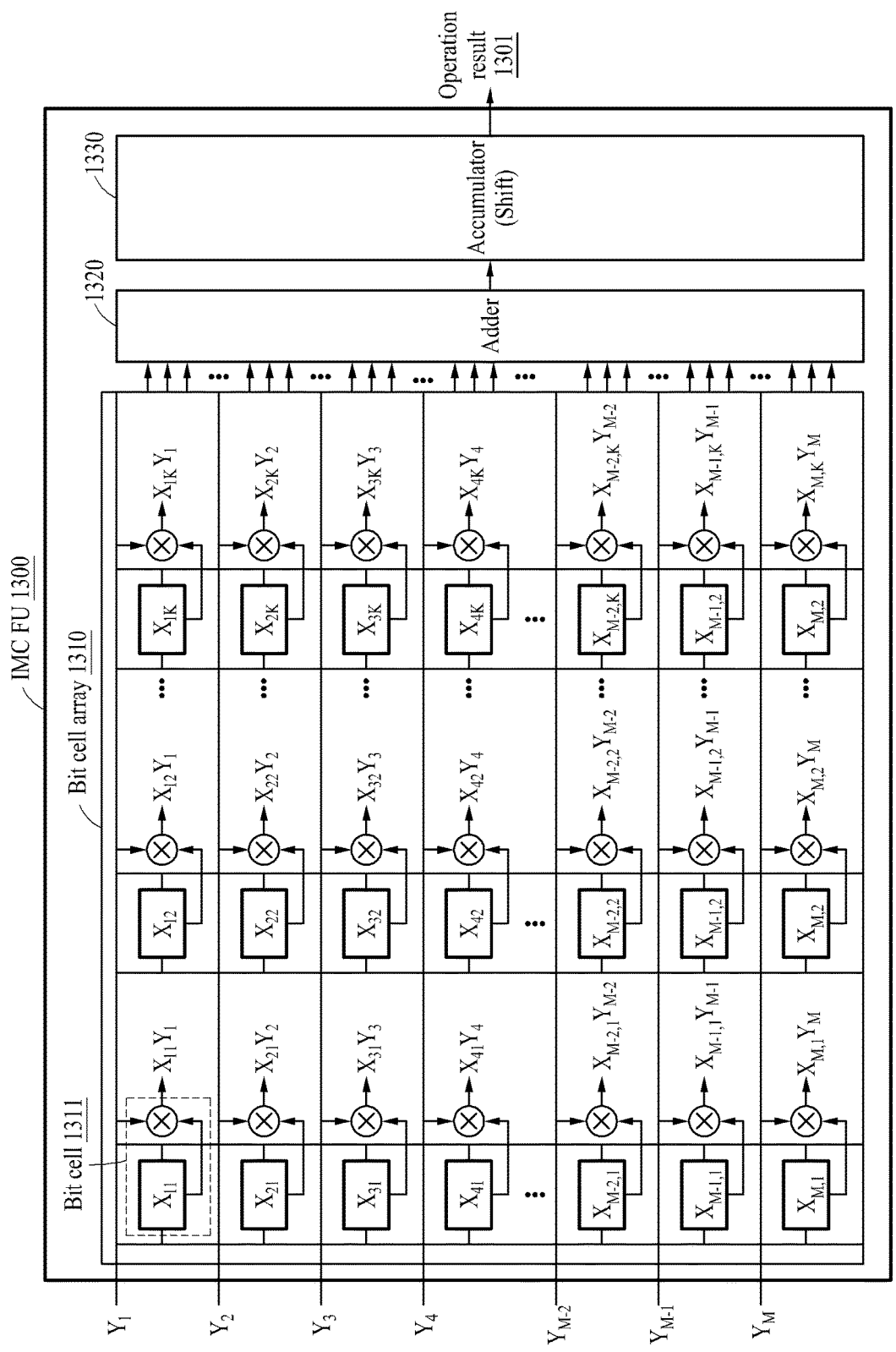
FIG. 13 illustrates an example structure of an IMC FU, according to one or more embodiments.

FIG. 13 illustrates an example structure of an IMC FU, according to one or more embodiments. The IMC FU in FIG. 13 may have various structures according to various in-memory operation architectures. Referring to FIG. 13, an IMC FU 1300 may include a bit cell array 1310 including bit cells such as a bit cell 1311. The IMC FU 1300 may also include an adder 1320 configured to perform addition operations on multiplication results of multiplication operations of each bit cell. The IMCFU may also include an accumulator 1330 configured to perform an accumulation operation on addition results of the addition operations of the adder 1320. An output of the accumulator 1330 may correspond to an operation result 1301 of a MAC operation between an input data/operand (bits $Y_1 \ldots Y_M$) and a stored data/operand stored in the bit cell array 1310. Each bit cell may perform multiplication operations of bit pairs according to at least a portion of the stored data and at least a portion of the input data. The adder 1320 may correspond to an adder tree. The accumulator 1330 may include a shift circuit configured to perform a shift to change a bit position. The input data may be, for example, feature data of a feature map, and the stored data may be, for example, weight data of a neural network (or the reverse).

The memory cell array 1310 may perform a bitwise multiplication operation between input data $Y_m$ and cell data $X_{mk}$. Here, m is greater than or equal to "1" and less than or equal to M, k is greater than or equal to "1" and less than or equal to K. The cell data $X_{mk}$ is representative of data stored in any of the bit cells. The cell data in $X_{mk}$ may be stored in the memory cell array 1310 before an operation is performed by the IMC FU 1300, and a multiplication operation result may be output when the input data $Y_m$ is input into the cell array 1310 after storing the cell data $X_{mk}$ in the memory cell array 1310 is completed.

A multiplication operation may be performed in various manners according to the memory type of each bit cell. For example, when each bit cell corresponds to a 6T SRAM, cell data $X_{mk}$ may be stored by inverters of each bit cell, input data $Y_m$ may be input through a word line, and output data $X_{mk}Y_m$ may be output through a bit line. In this case, a circuit element for a multiplication operation, such as a transistor or an inverter, may be added to each bit cell.

In the case of the input data $Y_m$ having a multi-bit data format, an operation may be performed when a bit stream corresponding to the input data $Y_m$ is sequentially input (streamed), one bit at a time, into the memory cell array 1310. For example, in a first stage, input data $Y_m$ corresponding to a first bit position (e.g., a least significant bit (LSB)) may be input into the memory cell array 1310, and output data $X_{mk}Y_m$ corresponding to the first bit position may be output from the memory cell array 1310. The adder 1320 may perform addition operations according to the output data $X_{mk}Y_m$, and the accumulator 1330 may accumulate addition results.

An addition result according to the input data $Y_m$ corresponding to the first bit position may be referred to as a first addition result. The accumulator 1330 may increase the bit position of the addition result through a shift operation. Since increasing the bit position is not required for the first bit position, a shift operation for the first addition result may be omitted. In a second stage, a second bit position of input data $Y_m$ may be input into the memory cell array 1310, and then an addition result corresponding to the second bit position may be determined. The addition result of the second bit position of the input data $Y_m$ may be referred to as a second addition result. Since the second bit position has a bit position greater than the first bit position by one, the bit position of the second addition result may be increased by one through one bit-shift operation on the second addition result. The accumulator 1330 may accumulate the first addition result and the second addition result (after its bit position has been shifted). The operation process described above may be repeated up to a last bit position (e.g., a most significant bit (MSB)) of the input data $Y_m$.

In the case of the cell data $X_{mk}$ having a multi-bit data format, cell data $X_{mk}$ of different bit positions may be stored in different bit cell arrays, and then, operation results may be shifted and accumulated to derive a final operation result. When the cell data $X_{mk}$ is weight data, the input data $Y_m$ may be input feature data (or the reverse).

Figure 14:
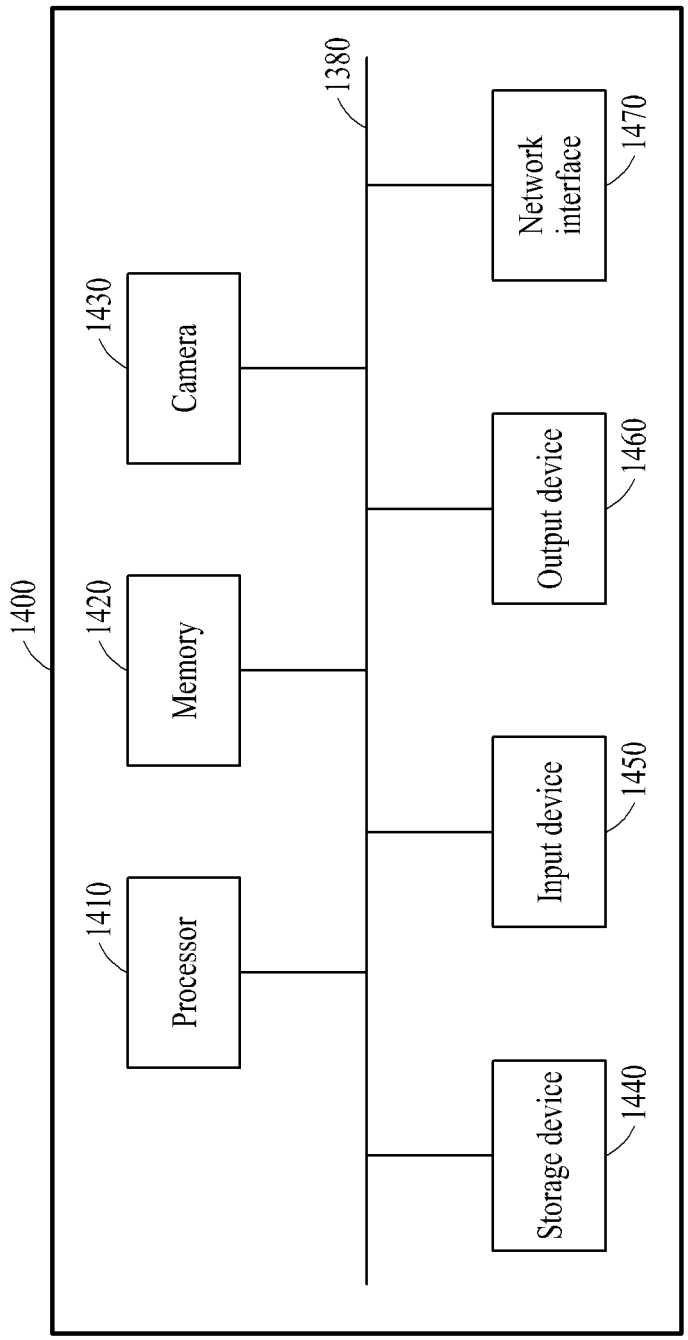
FIG. 14 illustrates an example configuration of an electronic device, according to one or more embodiments.

FIG. 14 illustrates an example configuration of an electronic device, according to one or more embodiments. Referring to FIG. 14, an electronic device 1400 may include a processor 1410, a memory 1420, a camera 1430, a storage device 1440, an input device 1450, an output device 1460, and a network interface 1470, and these components may communicate with one another through a communication bus 1480. For example, the electronic device 1400 may be implemented as at least a part of a mobile device such as a mobile phone, a smart phone, a personal digital assistant (PDA), a netbook, a tablet computer or a laptop computer, a wearable device such as a smart watch, a smart band or smart glasses, a computing device such as a desktop, a server or a data center, a home appliance such as a television, a smart television or a refrigerator, an Internet of things (IoT) device such as a voice triggering system (VTS), a security device such as a door lock, a vehicle such as an autonomous vehicle or a smart vehicle, or a robot such as a drone. The electronic device 1400 may include, structurally and/or functionally, the electronic device 100 of FIG. 1.

The processor 1410 executes instructions or functions to be executed in the electronic device 1400. For example, the processor 1410 may process the instructions stored in the memory 1420 or the storage device 1440. The processor 1410 may perform one or more, or all, of the operations or methods described above with reference to FIGS. 1 through 13. The memory 1420 may include a computer-readable storage medium or a computer-readable storage device. The memory 1420 may store instructions that are to be executed by the processor 1410, and may also store information associated with software and/or applications when the software and/or applications are being executed by the electronic device 1400.

The camera 1430 may capture a photo and/or a video. The storage device 1440 includes a computer-readable storage medium or computer-readable storage device. The storage device 1440 may store a greater amount of information than the memory 1420 and store the information for a long period of time. For example, the storage device 1440 may include a magnetic hard disk, an optical disk, a flash memory, a floppy disk, or other non-volatile memories known in the art.

The input device 1450 may receive an input from a user through a traditional input scheme using a keyboard and a mouse, and through a new input scheme such as a touch input, a voice input, and an image input. The input device 1450 may include, for example, a keyboard, a mouse, a touchscreen, a microphone, and other devices that may detect the input from the user and transmit the detected input to the electronic device 1400. The output device 1460 may provide an output of the electronic device 1400 to a user through a visual, auditory, or tactile channel. The output device 1460 may include, for example, a display, a touch screen, a speaker, a vibration generator, or any other device that provides an output to a user. The network interface 1470 may communicate with an external device through a wired or wireless network.

The computing apparatuses, the electronic devices, the processors, the memories, the displays, the information output system and hardware, the storage devices, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor comprising:
   a first function unit (FU) having a non-IMC (in-memory computing) operation architecture using an operation unit;
   a second FU having an IMC architecture using a memory cell array; and
   a register file is directly connected to the first FU and used by the first FU and the second FU, where the first FU directly accesses the register file.

2. The processor of claim 1, wherein
   the first FU is configured to perform non-IMC operation using a logic gate of the operation unit, and
   the second FU is configured to perform an IMC operation using a bit cell in the memory cell array.

3. The processor of claim 1, wherein the processor is a digital signal processor (DSP) and wherein the first FU comprises a scalar FU configured to perform a scalar operation or a vector FU configured to perform a vector operation.

4. The processor of claim 1, wherein the first FU and the second FU belong to different lanes of a set of lanes that are configured to process instructions independently of each other and in parallel.

5. The processor of claim 1, further comprising:
   a very long instruction word (VLIW) packetizer configured to generate a VLIW packet by packetizing independent instructions into the VLIW packet,
   wherein the first FU is configured to process a first instruction of the VLIW packet, and
   the second FU is configured to process a second instruction of the VLIW packet.

6. The processor of claim 1, further comprising:
   a buffer block disposed between the second FU and the register file and configured to perform data transmission between the second FU and the register file.

7. The processor of claim 6, wherein the buffer block comprises:
   an input first-in-first-out (FIFO) buffer configured to transmit input data stored in the register file to the memory cell array of the second FU; and
   an output FIFO buffer configured to transmit, to the register file, output data generated through the memory cell array of the second FU.

8. The processor of claim 6, wherein the register file comprises:
   a first register file used by the first FU; and
   a second register file used by the second FU,
   wherein when input data is loaded into the second register file, the input data is stored into the second FU via the buffer block.

9. The processor of claim 6, wherein
   the first FU is configured to load input data into the register file according to a load instruction,
   when the input data is loaded into the register file, the input data is transmitted to the buffer block, and
   the second FU is configured to store the input data stored in the buffer block into the memory cell array according to a pop instruction.

10. The processor of claim 6, wherein
    the first FU is configured to load input data into the register file according to a load instruction,
    when the input data is loaded into the register file, the input data is transmitted to the buffer block, and
    the second FU is configured to, in a buffer mode, store the input data stored in the buffer block into the memory cell array without an explicit instruction.

11. The processor of claim 6, wherein the second FU is configured to, when neural network input data is input into the memory cell array of the second FU in a state in which neural network weight data is stored in the memory cell array of the second FU, generate neural network output data by performing a multiply-accumulate (MAC) operation between the neural network weight data and the neural network input data.

12. The processor of claim 11, wherein the second FU is configured to store the network output data stored in the memory cell array into the register file through the buffer block according to a push instruction.

13. The processor of claim 1, wherein one of the first FU and the second FU is configured to perform a first operation and store a first operation result into the register file, and
    the other one of the first FU and the second FU is configured to perform a second operation based on the first operation result.

14. A digital signal processor (DSP) comprising:
    a very long instruction word (VLIW) packetizer configured to generate a VLIW packet by packetizing a plurality of independent instructions; and
    a first lane configured to process a first instruction of the VLIW packet based on a non-IMC architecture using an operation unit; and
    a second lane configured to process a second instruction of the VLIW packet based on an IMC operation architecture using a memory cell array,
    wherein the first instruction and the second instruction are processed in the first lane and the second lane in parallel.

15. The DSP of claim 14, wherein
a first function unit (FU) of the first lane is configured to perform a non-IMC operation using a logic gate of the operation unit, and
a second FU of the second lane is configured to perform an IMC operation using a bit cell in the memory cell array.

16. The DSP of claim 14, wherein
the first lane comprises a first FU having the non-IMC operation architecture and a first register file used by the first FU,
the second lane comprises a second FU having the memory cell array and a second register file used by the second FU,
wherein the DSP further comprises a buffer block disposed between the second FU and the second register file and configured to perform data transmission between the second FU and the second register file.

17. The DSP of claim 16, wherein one of the first FU and the second FU is configured to perform a first operation to process the first instruction and store a corresponding first operation result in one of the first register file and the second register file, and the other one of the first FU and the second FU is configured to perform a second operation to process the second instruction based on the first operation result.

18. A method comprising:
fetching, by a processor, an instruction comprising a bundle of instructions including a first instruction, a second instruction, and a third instruction;
executing the fetched first instruction by a first non-IMC FU of a first lane of the processor;
executing the fetched second instruction by a second non-IMC FU of a second lane of the processor; and
executing the fetched third instruction by an IMC FU of a first lane of the processor,
wherein the first lane and the second lane perform operations independently and in parallel.

19. The method of claim 18, wherein the processor comprises a single chip, wherein the first non-IMC FU comprises a vector FU, the second non-IMC FU comprises a scalar FU, and the IMC FU is configured to perform a multiply-and-accumulate on data retained in memory of the IMC FU.

20. The method of claim 18, further comprising placing the processor in a buffer mode and based thereon configuring the processor to cause the IMC FU to function as a buffer for the first non-IMC FU and the second non-IMC FU.

\* \* \* \* \*